(12) United States Patent
Gretz

(10) Patent No.: US 11,949,194 B1
(45) Date of Patent: Apr. 2, 2024

(54) ONE-PIECE ELECTRICAL FITTING FOR SNAP CONNECTION

(71) Applicant: Arlington Industries, Inc., Scranton, PA (US)

(72) Inventor: Thomas J. Gretz, Delray Beach, FL (US)

(73) Assignee: Arlington Industries, Inc., Scranton, PA (US)

( * ) Notice: Subject to any disclaimer, the term of this patent is extended or adjusted under 35 U.S.C. 154(b) by 74 days.

(21) Appl. No.: 17/459,060

(22) Filed: Aug. 27, 2021

Related U.S. Application Data

(63) Continuation-in-part of application No. 17/032,569, filed on Sep. 25, 2020, now Pat. No. 11,223,168, which is a continuation of application No. 16/815,102, filed on Mar. 11, 2020, now Pat. No. 10,826,253, which is a continuation-in-part of application No. 16/451,069, filed on Jun. 25, 2019, now Pat. No. 10,630,030, which is a continuation of application No. 15/991,726, filed on May 29, 2018, now Pat. No. 10,374,371, which is a continuation of (Continued)

(51) Int. Cl.
| | | |
|---|---|---|
| H02G 3/18 | (2006.01) | |
| H01R 4/64 | (2006.01) | |
| H01R 13/11 | (2006.01) | |
| H01R 13/655 | (2006.01) | |
| H01R 13/74 | (2006.01) | |
| H02G 3/06 | (2006.01) | |

(52) U.S. Cl.
CPC ............ *H01R 13/745* (2013.01); *H01R 4/64* (2013.01); *H01R 13/111* (2013.01); *H01R 13/655* (2013.01); *H01R 13/743* (2013.01); *H02G 3/0625* (2013.01)

(58) Field of Classification Search
CPC ...... H01R 13/745; H01R 4/64; H01R 13/111; H01R 13/655; H01R 13/743; H01R 13/648; H01R 13/658; H02G 3/0625; H02G 3/0666; H02G 3/0641; H02G 3/0616; H02G 3/00; H02G 3/02
USPC ..... 174/661, 665, 650, 666, 659, 68.1, 68.3, 174/72 C, 69, 71 R, 657, 70 R, 660; 439/142, 320, 557, 567, 552, 587, 96, 439/460; 403/197, 68.1, 56, 74.2
See application file for complete search history.

(56) References Cited

U.S. PATENT DOCUMENTS

| | | |
|---|---|---|
| 2,744,769 A | 5/1956 | Roeder et al. |
| 3,858,151 A | 12/1974 | Paskert |

(Continued)

*Primary Examiner* — Angel R Estrada

(57) ABSTRACT

A one-piece electrical fitting for connecting an electrical cable to a junction box, the electrical fitting formed from a single, flat blank of metal into a cylindrical connector body. The connector body includes a leading end having an exit bore, a trailing end, a cap, an inner bore, and one or more combination tangs including grounding tangs, locking tangs, and flanges extending radially outward from the connector body. The exit bore in the cap is offset to one side with cable retaining tangs on the fitting configured to push toward the exit bore in order to ease insertion of cables and conductors through the fitting. The one-piece electrical fitting includes a connector body with a D-shaped cross-sectional profile and one or more auxiliary grounding tangs extending outward from the connector body to improve grounding of the fitting with respect to an electrical box.

9 Claims, 27 Drawing Sheets

Related U.S. Application Data application No. 15/648,567, filed on Jul. 13, 2017, now Pat. No. 9,966,708.

(56) References Cited

U.S. PATENT DOCUMENTS

| | | | |
|---|---|---|---|
| 4,012,578 A | 3/1977 | Moran et al. | |
| 4,621,166 A | 11/1986 | Neuroth | |
| 4,880,387 A | 11/1989 | Stikeleather et al. | |
| 4,990,721 A | 2/1991 | Sheehan | |
| 5,422,437 A | 6/1995 | Schnell | |
| D360,188 S | 7/1995 | Kiely et al. | |
| 5,731,543 A | 3/1998 | Jorgensen | |
| D404,362 S | 1/1999 | Auray et al. | |
| 6,020,557 A | 2/2000 | Jorgensen | |
| 6,335,488 B1 | 1/2002 | Gretz | |
| 6,596,939 B1 | 7/2003 | Gretz | |
| 6,916,988 B1 | 7/2005 | Auray et al. | |
| 7,060,900 B1 | 7/2006 | Gretz | |
| 9,966,708 B1 * | 5/2018 | Gretz | H01R 13/655 |
| 10,826,253 B2 * | 11/2020 | Gretz | H02G 3/0625 |
| 2005/0269122 A1 | 12/2005 | Pyron | |

* cited by examiner

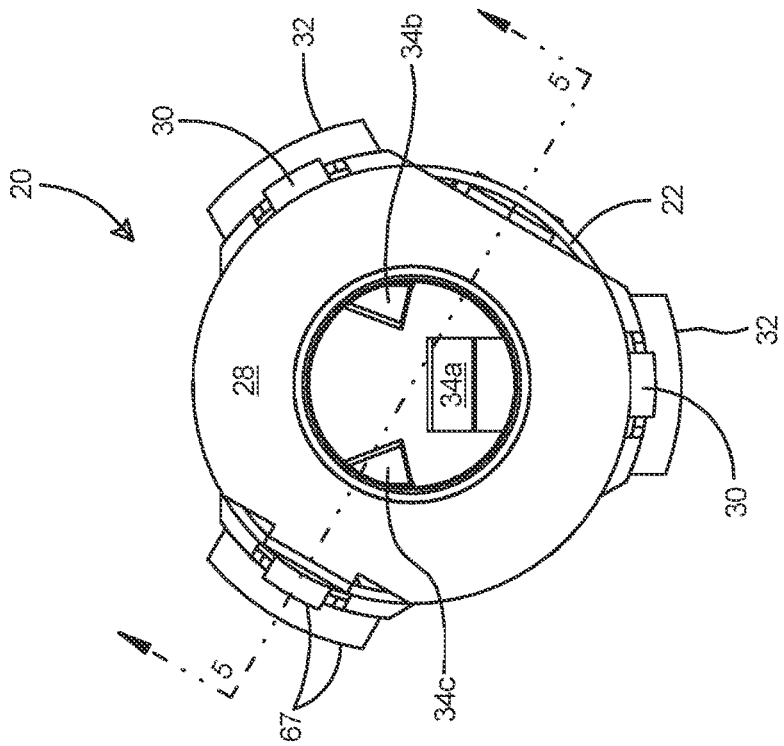
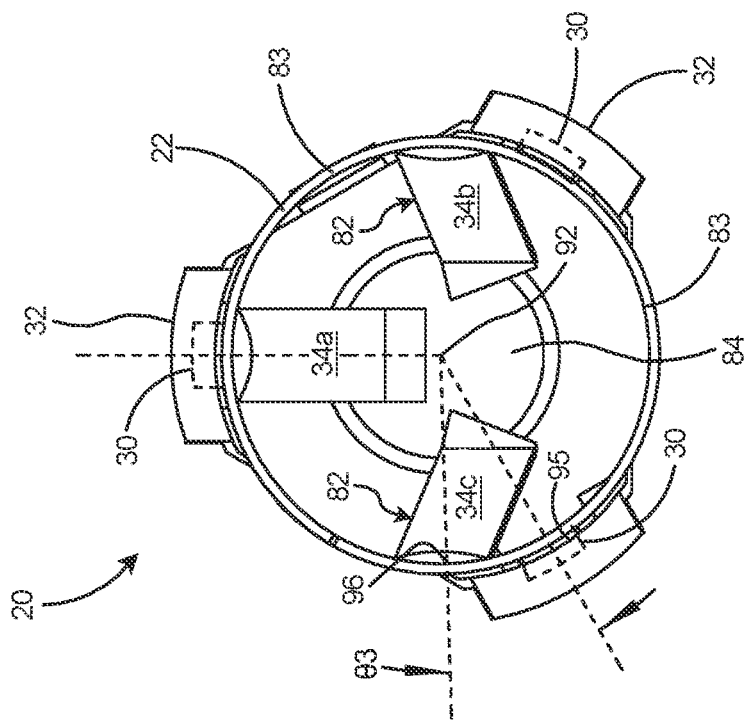
Fig. 4
Fig. 3

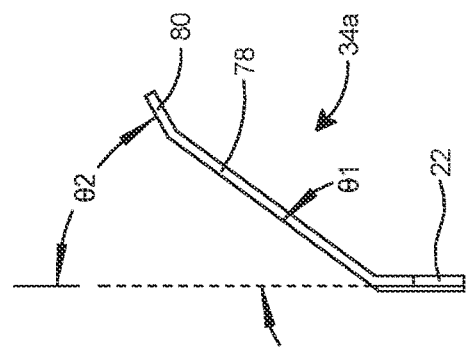
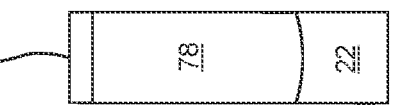
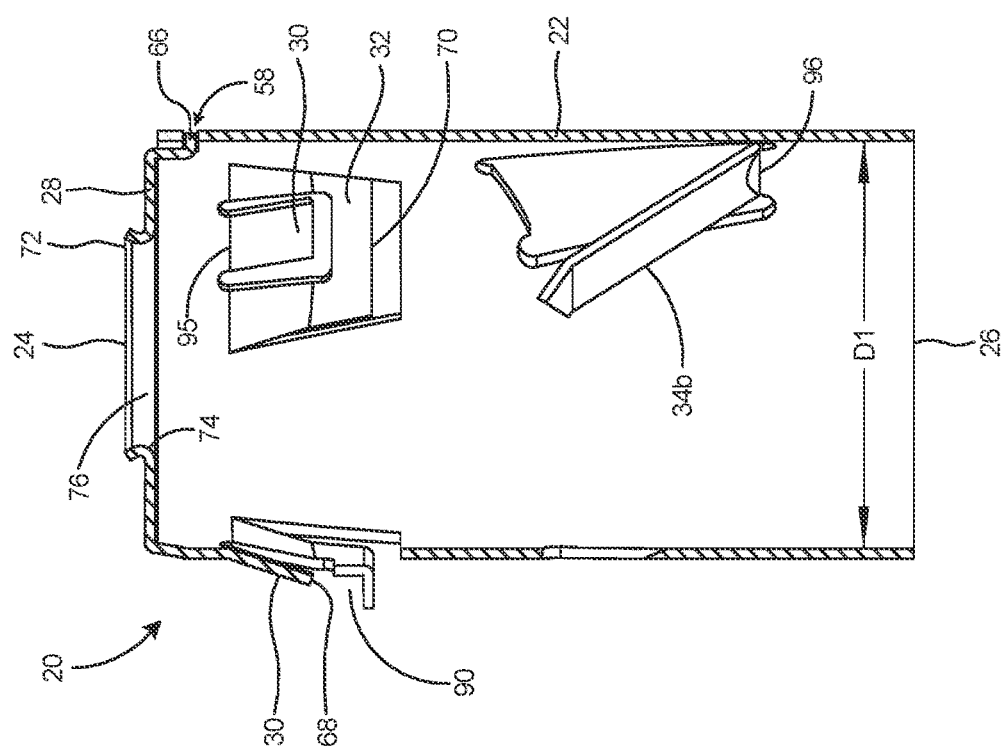

ONE-PIECE ELECTRICAL FITTING FOR SNAP CONNECTION

This application is a continuation-in-part of U.S. patent application Ser. No. 17/032,569, filed Sep. 25, 2020, which is still pending, which is a continuation of U.S. patent application Ser. No. 16/815,102, filed Mar. 11, 2020, now U.S. Pat. No. 10,826,253, which is a continuation-in-part of U.S. patent application Ser. No. 16/451,069, filed Jun. 25, 2019, now U.S. Pat. No. 10,630,030, which is a continuation of U.S. patent application Ser. No. 15/991,726, filed May 29, 2018, now U.S. Pat. No. 10,374,371, which is a continuation of U.S. patent application Ser. No. 15/648,567, filed Jul. 13, 2017, now U.S. Pat. No. 9,966,708, all of which applications have in common the same inventors and assignee of the present application and the entire contents of which are incorporated herein in their entirety by reference.

FIELD OF THE TECHNOLOGY

The invention relates generally to one-piece electrical fittings for connecting electrical cables to junction boxes. In particular, the invention relates to one-piece electrical fittings formed from a single sheet of metal into a unitary, cylindrical body for securing electrical cables to junction boxes with snap-in, or otherwise known as quick-connect, features that eliminate the need for installation tools.

BACKGROUND

Quick-connect electrical fittings require production and secondary assembly of several components. The connector body is die-cast of metal, while separate parts are stamped of sheet metal and then secured to the connector body in a secondary assembly process. Die-casting is an expensive procedure that requires precision machinery, costly molds, and consumes a substantial amount of metal alloy. Making and assembling separate parts adds to these costs. A need therefore exists for one-piece electrical fittings that reduce production costs and eliminate secondary assembly processes. These one-piece electrical fittings must be capable of establishing and maintaining electrical continuity between electrical cables, the fittings, and junction boxes. Furthermore, these one-piece electrical fittings must have quick-connect structures at the leading end for connection to a junction box and at the trailing end for securing electrical cables as well as restricting rearward removal of the cables.

BRIEF SUMMARY OF THE INVENTION

To address the foregoing needs, Applicant has invented one-piece electrical fittings with a leading end and a trailing end formed from a single flat blank of metal. A locking arrangement of tabs and complementary grooves facilitates rolling the single blank into a cylindrical body. The tabs extend from a second edge of the single blank, and a first edge of the blank defines complementary grooves to receive and lock the tabs when the blank is rolled into a cylindrical body. A cap extends from the leading end of the blank by way of a hinge. The cap is bent over to form the leading end of the cylindrical connector body and hold it together through with a locking arrangement.

Several embodiments of the cap and locking arrangement are provided. According to one embodiment, a tab extends from the cap and engages a leading edge slot in the connector body. According to a further embodiment, one or more tabs extend from the connected body and are bent over notches in the outer periphery of the cap. The cap also includes a central opening and a lip that is rolled outwardly to form an arcuate shoulder. Alternatively, an insert with a smooth plastic throat is inserted into the central opening of the cap.

One or more grounding and locking tangs extend radially outward from the circumference of the connector body. According to one embodiment, each grounding tang includes a flange and each locking tang includes a free end. According to a further embodiment, the locking tangs extend from an interior base of the grounding tangs. According to a further embodiment, flanges extend outward from the connector body and are separate from the locking tangs and grounding tangs. According to a further embodiment, the grounding tangs, locking tangs, and flanges each extend separately from the connector body. One or more cable retaining tangs extend radially inward from the connector body into the inner bore.

According to yet another embodiment, a rolled edge at the trailing end of the fitting gives a smooth, broad pushing surface versus to make it easier for an installer to press the fitting into the knockout aperture of an electrical box.

The fitting further includes a recessed portion around the exit bore in the cap in order to better accommodate insertion of an insulating liner to prevent abrasion to insulated conductors that are fed through the fitting.

Furthermore, the exit bore in the cap is offset to one side and cable retaining tangs are configured to push toward the exit bore in order to ease insertion of cables and conductors through the fitting.

This embodiment features two combination tangs, including both locking tangs and grounding tangs that positioned 180 degrees that facilitate easier snap-in inserting into the knockout hole of an electrical box.

A further embodiment includes a connector body with a D-shaped profile and one or more auxiliary grounding tangs extending outward from the connector body.

Exemplary Advantages

The one-piece electrical fittings are formed from a single, unitary flat blank of metal. As a result, these one-piece electrical fittings substantially reduce production costs by eliminating the need for expensive and complex die-casting of the connector body, separate stamping of sheet metal into quick-connect parts for the leading and trailing ends, and subsequent assembly of all parts in secondary processes.

The one-piece electrical fittings further provide easy snap-in insertion of an electrical cable into a knockout of an electrical box, including easy snap-in insertion of an electrical cable at the trailing end of the fitting and easy snap-in insertion into the knockout at the leading end of the fitting. At the same time, the one-piece electrical fittings further provide strain relief to restrict rearward removal of the electrical cable from the fitting. As a result, the one-piece electrical fittings provide cost-effective and efficient means for installing electrical cables to junction boxes.

The one-piece electrical fittings of the current invention do not require a separate split ring for connecting the fitting to the junction box. Nor do the one-piece electrical fittings require separate cable retaining rings or clips for securing electrical cables into the fitting.

BRIEF DESCRIPTION OF THE DRAWINGS

FIG. 3 is an end view of a one-piece electrical fitting according to one embodiment.

FIG. 4 is an end view of the one-piece electrical fitting of FIG. 1.

FIG. 5 is a sectional view of the one-piece electrical fitting of FIG. 1 taken along line 5-5 of FIG. 4.

FIG. 6 is a plan view of an embodiment of a first cable retaining tang.

FIG. 7 is a side view of the first cable retaining tang of FIG. 6.

Figure 1:
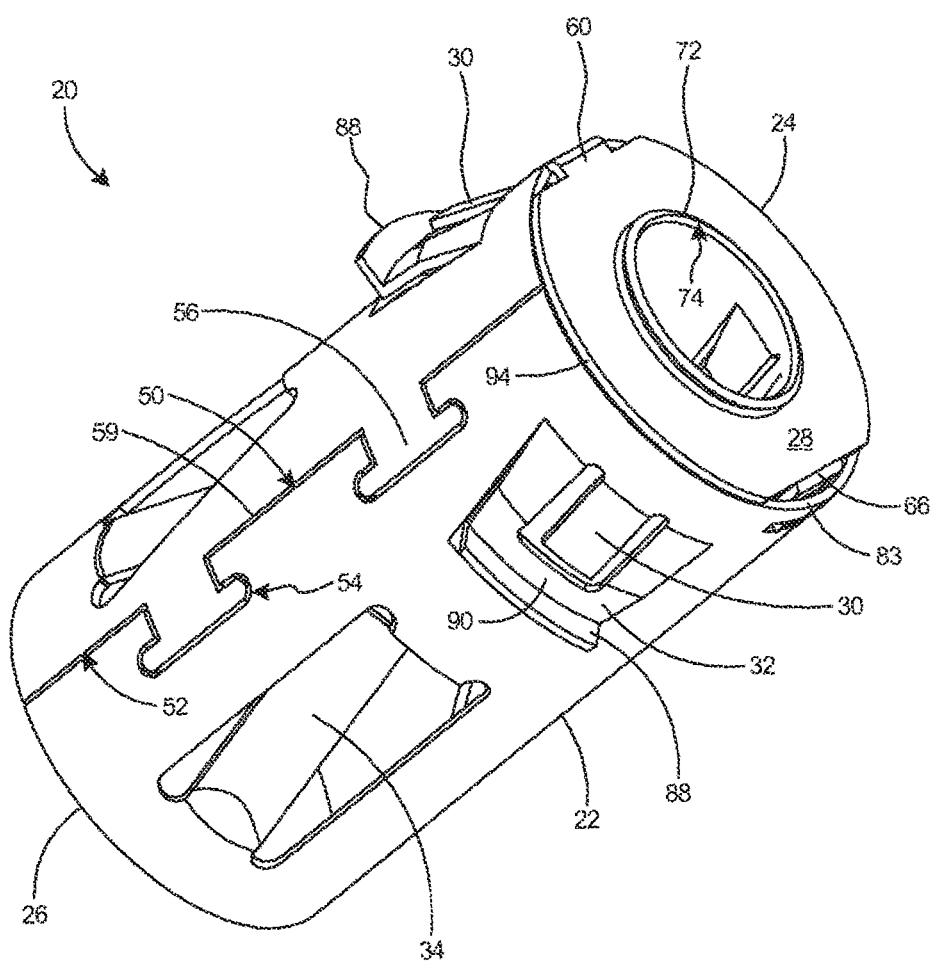
FIG. 1 is an isometric view of a one-piece electrical fitting according to one embodiment.

INDEX TO REFERENCE NUMERALS IN DRAWINGS 20 one-piece electrical fitting
22 connector body of one-piece electrical fitting
24 leading end of the connector body
26 trailing end of the connector body
28 cap
30 locking tangs
32 grounding tangs
34 cable retaining tangs
36 blank
38 leading end of the blank
40 trailing end of the blank
41 slit defining grounding tangs
42 slit defining cable retaining tangs
44 slot defining locking tangs
46 parallel slots defining cable retaining tangs
48 projection forming cap
50 first edge of blank
52 second edge of blank
54 T-shaped slots
55 side channels of T-shaped slots 56 T-shaped tabs
57 side extensions of T-shaped tabs
58 leading edge slot of blank
59 longitudinal seam
60 hinge
62 main body portion of cap
64 opening in cap or exit bore
66 tab extending from the main body portion
67 outer ends of locking tangs and grounding tangs
68 free end of locking tangs
70 second bend-line of grounding tangs
72 lip of cap
74 arcuate shoulder
76 inner surface of lip
78 arm of cable retaining tangs
80 end portion of arm
81 angled end portion of cable retaining tangs 34b and 34c
82 major side of cable retaining tangs 34b and 34c
83 wall of connector body
84 open area at center of fitting
85 base of grounding tangs
86 end portion of grounding tangs
88 grounding flanges
89 inner bore
90 seat of grounding tangs
92 center axis of connector body
94 outer periphery of cap
95 base of locking tangs
96 base of cable retaining tangs
97 first leg extending from cap
98 second leg extending from cap
200 second and preferred embodiment of one-piece electrical fitting
256 tabs at longitudinal seam
270 notches of cap
272 outer periphery of cap
283 tabs of connector body
300 third embodiment of one-piece electrical fitting
330 locking tangs
331 outer circumference of connector body
332 grounding tangs
338 flanges
370 notches of cap
383 tabs of connector body
390 seat
400 fourth embodiment of one-piece electrical fitting
430 locking tangs
432 grounding tangs
488 flanges
500 fifth embodiment of one-piece electrical fitting
502 cable retaining arrangement
534 cable retaining tang
536 two sides of cable retaining tang
538 slots forming two sides
540 blank
542 bifurcated end
544 slit in blank
546 base of cable retaining tang
548 slot dividing cable retaining tang
550 arms of cable retaining tang
552 bend-line of arms
556 flat wall portion of connector body
558 end portion of cable retaining tang
600 sixth embodiment of one-piece electrical fitting
634 cable retaining tangs
636 end portion of cable retaining tang
638 outer side of cable retaining tang
640 inner side of cable retaining tang
642 termination point of inner side of cable retaining tang
644 inner bore
646 wall of connector body
700 seventh embodiment of one-piece electrical fitting
728 cap
764 opening
766 tubular insert
770 leading flange of tubular insert
772 trailing flange of tubular insert
774 recess
776 throat of tubular insert
800 eighth embodiment of one-piece electrical fitting
802 rolled edge
803 recessed portion of cap
804 inner periphery of cap
805 edge of blank
806 lip
807 blank
808 edge tab
810 paired edge tabs
811 combination tang
812 edge slot
813 notch
814 central axis of fitting
815 central axis of opening or exit bore
816 offset of exit bore from central axis of fitting
818 narrow aspect of cap
820 wide aspect of cap
821 inner circumference of the connector body
822 inner circumference of the connector body
900 ninth embodiment of one-piece electrical fitting
901 cylindrical portion of connector body
902 flat portion of connector body
904 auxiliary grounding tang
905 end of auxiliary grounding tang
906 trailing end gap (opposite flat body portion, non-rollover section)
908 blank
910 longitudinal seam
911 inner wall of the connector body
912 wall of electrical box

DETAILED DESCRIPTION

FIG. 1 shows a one-piece electrical fitting 20 according to a first embodiment. The one-piece electrical fitting 20 has a cylindrical connector body 22 with a leading end 24 and a trailing end 26. The leading end 24 is formed by a cap 28 that extends from the connector body 22 by way of a hinge 60. The shape of the cap 28 in this embodiment is shown as a truncated circle with an outer periphery 94 that corresponds to the circumference of the cylindrical connector body 22. The outer periphery 94 preferably forms a diameter of the cap 28 that is larger than the diameter of cylindrical connector body 22.

A tab 66 extends from cap 28 on a truncated side opposite from hinge 60. Tab 66 engages a leading edge slot 58 near the leading end 24 of the connector body 22 to hold the connector body together. The cap 28 further includes a central opening with an outwardly-rolled lip 72 to form an arcuate shoulder 74 on inner surface 76 (see FIG. 5). The arcuate shoulder 74 will provide a smooth surface for any electrical conductors (not shown) inserted through the cap 28, preventing cutting or abrasion of the insulating sheaths on the electrical conductors.

The one-piece electrical fitting 20 further includes one or more locking tangs 30 and one or more grounding tangs 32 extending radially outward from the connector body 22. In one embodiment, a locking tang 30 is part of an interior base of grounding tang 32. Grounding tangs 32 each include a grounding flange 88 extending further outward from the grounding tangs 32 at an angle that is substantially perpendicular to the connector body 22. During installation and operation, the grounding flange 88 stops forward advancement of the one-piece electrical fitting 20 into a junction box (not shown). Grounding tangs 32 also include a seat 90 between grounding flange 88 and the locking tangs 30. During operation, the seat 90 sits flush against and accommodates the inner periphery or inner wall of a knockout hole in a junction box (not shown). The one-piece electrical fitting 20 further includes one or more cable retaining tangs 34 extending radially inward from the connector body 22.

A longitudinal seam 59 runs from the trailing end 26 to the leading end 24 of the connector body 22. Two edges 50 and 52 are joined at this seam 59 through a flush, gap-free locking arrangement of tabs 56 extending from the second edge 52 and corresponding slots or grooves 54 in the first edge 50. In one embodiment, the tabs 56 and grooves 54 are T-shaped, as shown in FIG. 1. The one-piece electrical fitting 20 is held together by way of the locking arrangement of the tabs 56 and grooves 54 in combination with the cap 28, which is in locking engagement with the connector body 22.

Figure 2:
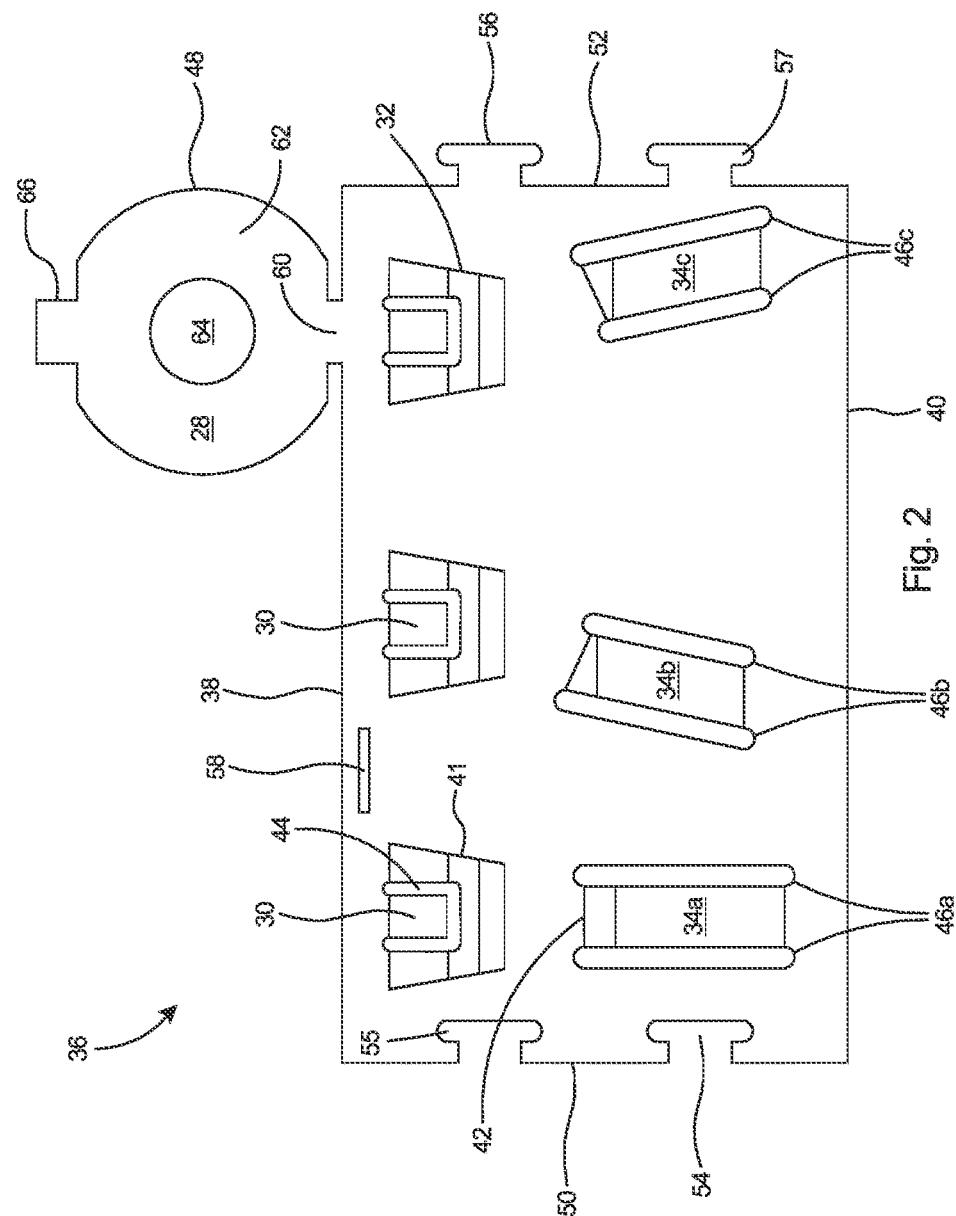
FIG. 2 is a plan view of a blank used to form the one-piece electrical fitting of FIG. 1.

Referring to FIG. 2, the one-piece electrical fitting 20 is formed from a single blank 36 constructed preferably of metal and rolled into a cylindrical shape in a forming operation. The blank 36 is formed from a flat metal sheet and includes a leading end 38 and a trailing end 40. The blank's leading end 38 along with the cap 28 will form the connector body's leading end 24, while the blank's trailing end 40 will form the connector body's trailing end 26. The overall shape and portions of the blank are removed in a metal-stamping operation to form features in the eventual connector body 22.

The blank 36 includes a first edge 50 and a second edge 52. First edge 50 includes two T-shaped slots or grooves 54 and the second edge 52 includes two complementary T-shaped tabs 56 which will extend into the T-shaped grooves when the blank is rolled into a cylindrical shape in a forming operation. T-shaped slots 54 include side channels 55 and T-shaped tabs 56 include side extensions 57. The blank 36 further includes a leading edge slot 58 that is substantially parallel with the leading end 38. As shown in FIG. 1, the two edges 50 and 52 of the fitting form a flush, gap-free connection along the longitudinal seam 59 of the connector body 22.

A projection 48 from the leading end 38 will form the cap 28. The cap 28 projects from the blank 36 by way of the hinge 60. As described with reference to FIG. 1, the cap 28 has a circular shape with a main body portion 62 truncated at two opposing sides. The hinge 60 connects to one truncated side of the cap 28, while tab 66 extends from a different truncated side. The cap 28 further has an opening 64 in its center.

As further shown in FIG. 2, slits 41 are formed to define the grounding tangs 32. Slits 42 are formed to define the cable retaining tangs 34. U-shaped slots 44 are formed to define the locking tangs 30. A series of paired parallel slots 46a, 46b, and 46c are formed to define a plurality of cable retaining tangs 34a, 34b, and 34c. Preferably, paired parallel slots 46a are parallel with first edge 50 and second edge 52, paired parallel slots 46b are sloped toward the second edge 52, and paired parallel slots 46c are sloped away from the second edge 52. The projection 48 includes a hinge 60 extending from the leading end 38, a main body portion 62, an opening 64, and a tab 66.

After the blank 36 is stamped out, the locking tangs 30 and grounding tangs 32 are bent out of the plane of the blank 36 such that they extend radially outward from the cylindrical connector body 22 once the blank 36 has been rolled into the one-piece electrical fitting 20. The cable retaining tangs 34a, 34b, and 34c are bent out of the plane of the blank 36 such that they extend radially inward from the connector body 22 once the blank 36 has been rolled into the one-piece electrical fitting 20.

As shown in FIGS. 3 and 4, the blank is then rolled into a cylindrical shape to form the connector body 22, with the cable retaining tangs 34a, 34b, and 34c extending radially inward of the connector body 22. The cable retaining tangs 34b and 34c each include a major side 82 and are slanted in opposing directions with respect to tang 34a. The cable retaining tangs 34a, 34b, and 34c in combination will direct an electrical cable (not shown) inserted into the electrical fitting 20 toward the open area 84 at the center of the fitting 20 and will securely engage and hold the cable between the cable retaining tangs 34a, 34b, and 34c and the wall 83 of the connector body.

The locking tangs 30 and grounding tangs 32 extending radially outward of the tubular connector body 22. Laterally across the connector body, the outer ends 67 of locking tangs 30 and grounding tangs 32 are arcuate in shape, as shown in FIG. 4. Locking tangs 30 each include a base 95 at its connection to the wall 83 and each of the cable retaining tangs include a base 96 at their respective connections to the wall 83. Preferably at least one locking tang 30 is offset angularly by angle θ3 from the cable retaining tang 34c. Thus, at least one locking tang 30 is not in longitudinal alignment with a cable retaining tang 34b along the connector body 22. Preferably two locking tangs 30 are offset radially from the cable retaining tangs 34 with respect to the axial center 92 of the connector body 22.

With reference to FIG. 5, tab 66 of cap 28 extends into and engages leading edge slot 58 to hold the connector body 22 together. The locking tangs 30 are bent radially outward from the connector body 22. The locking tangs 30 include free ends 68 that are flat in cross-section and oriented toward the trailing end 26 of the connector body 22. The grounding tangs 32 are also bent radially outward from the connector body 22, oriented toward the trailing end 26 of the connector body 22, and include a second bend-line 70. The locking tangs 30 and the grounding tangs 32 extend at different angles outward from the connector body 22. The grounding flanges 88 extend from the grounding tangs 32 at yet another angle, which is in this embodiment substantially perpendicular to the wall 83 of the connector body 22.

The cap 28 includes a lip 72 that is rolled outwardly to provide an arcuate shoulder 74 on its inner surface 76. The arcuate shoulder 74 provides a smooth surface for any electrical conductors (not shown) that are inserted through the opening in the cap 28, preventing any potential cutting or abrasion of the insulating sheaths on the electrical conductors. Tab 66 is engaged with leading edge slot 58. The connector body 22 includes a substantially constant diameter D1 from leading end 24 to trailing end 26.

Figures 8, 9:
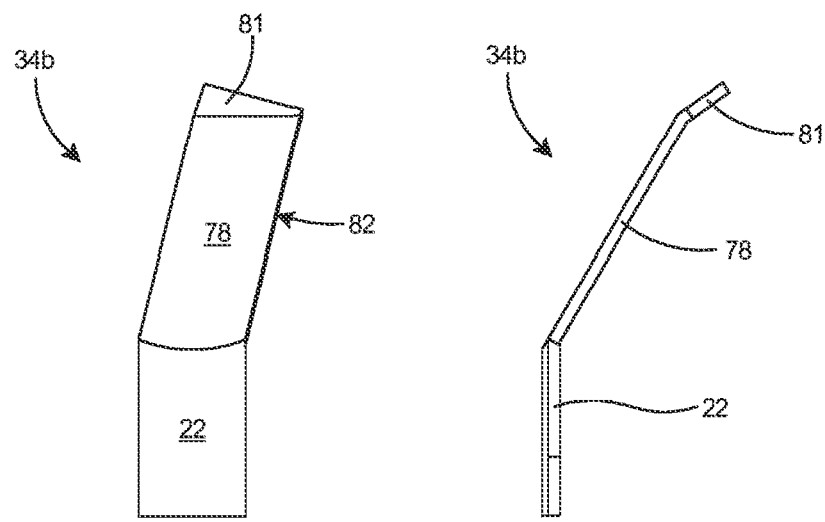
FIG. 8 is a plan view of an embodiment of a second cable retaining tang.
FIG. 9 is a side view of the second cable retaining tang of FIG. 8.
Figures 10, 11:
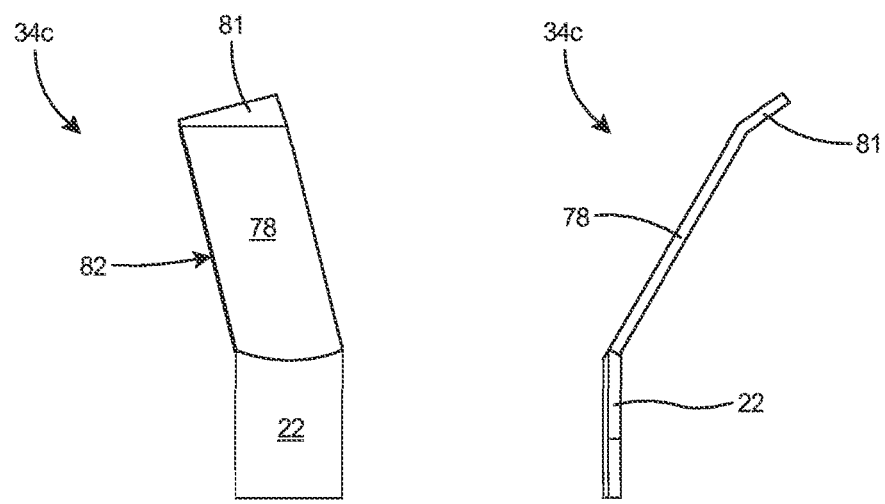
FIG. 10 is a plan view of an embodiment of a third cable retaining.
FIG. 11 is a side view of the third cable retaining tang of FIG. 10.
Figure 12:
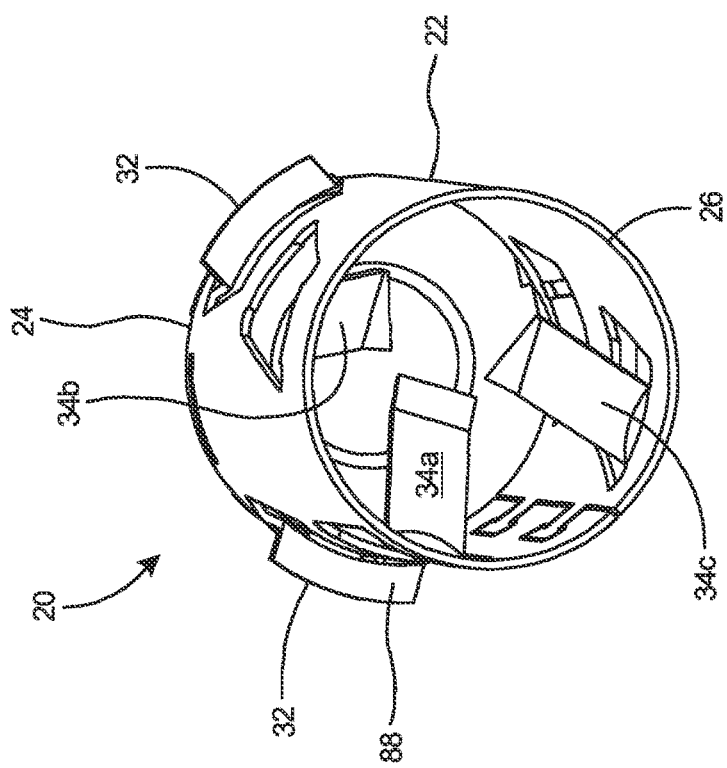
FIG. 12 is an isometric view of a one-piece electrical fitting as viewed from the trailing end according to one embodiment.

The cable retaining tangs, of which 34b is visible in FIG. 5, are oriented toward the leading end 24 of the connector body 22. Referring to FIGS. 6-11, each cable retaining tang 34a, 34b, and 34c includes an arm 78 extending inward from the connector body 22 and an end portion 80, with the arm 78 bent at a first angle θ1 with respect to the connector body and the end portion 80 bent at a second angle θ2 with respect to the connector body 22. As shown in FIG. 6, cable retaining tang 34a terminates in a flat end portion 80. As shown in FIGS. 8 and 10, cable retaining tangs 34b and 34c terminate in an angled end portion 81, respectively. The angled end portions 81 are slanted in opposing directions, as shown in FIG. 12.

Figure 13:
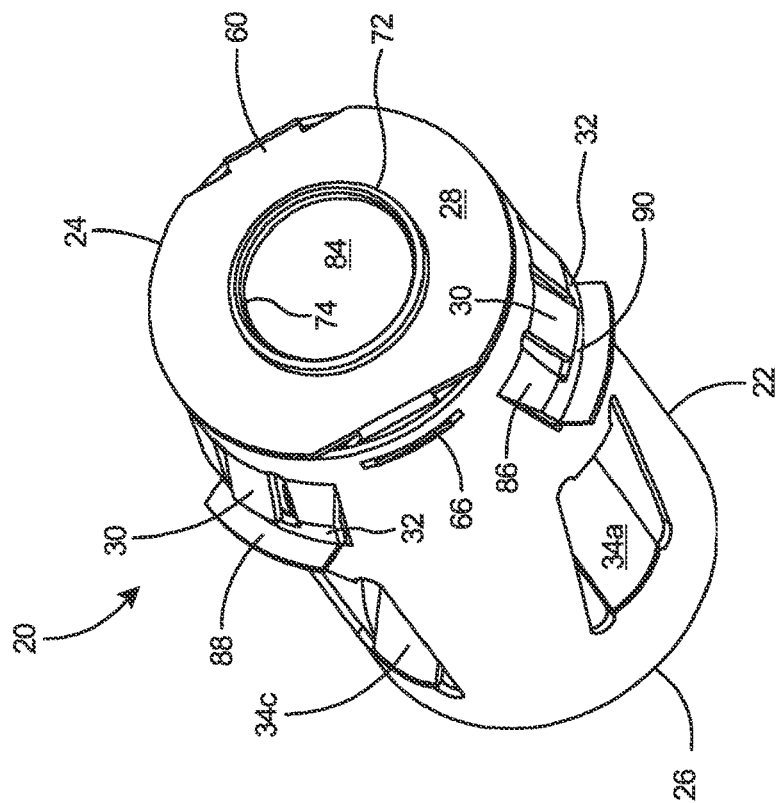
FIG. 13 is an isometric view of the one-piece electrical fitting of FIG. 1 as viewed from the leading end.

As shown in FIG. 13, locking tangs 30 extend from the interior of the base 85 of the grounding tangs 32. A seat 90 extends between the end of each locking tang 30 and the flange 88 of each grounding tang 32. When the one-piece electrical fitting 20 is inserted within a junction box (not shown), locking tangs 30 will depress and snap outwards after the wall of the junction box has cleared the locking tangs. When pressing the electrical fitting 20 within a knockout aperture (not shown), the locking tangs 30 will flex inward until the locking tangs have cleared the junction box wall (not shown), after which the locking tangs will snap outward to their unbiased positions.

Flange 88 will stop forward advancement of the one-piece electrical fitting 20 into the junction box. Locking tangs 30 and flanges 88 of grounding tangs 32 will then retain the inner periphery or wall of the knockout aperture in the seat 90. The one-piece metal construction of the electrical fitting 20, and the pressure exerted by the resilient locking tangs and the grounding tangs, provide good electrical continuity or grounding between the one-piece electrical fitting 20 and the junction box. Likewise, the one-piece metal construction of the electrical fitting 20, and the pressure exerted by the cable retaining tangs 34a, 34b, and 34c, provide good electrical continuity or grounding between the one-piece electrical fitting 20 and the inserted electrical cable. Furthermore, the locking tangs 30 and grounding tangs 32 will hold the one-piece electrical fitting 20 firmly to the junction box, while the cable retaining tangs 34a, 34b, and 34c will hold an electrical cable securely in the one-piece electrical fitting 20 and junction box. The bent arms 78 in combination with the end portions 80 and 81 of the cable retaining tangs 34 further act to restrict rearward withdrawal of inserted electrical cables. At the same time, the cable retaining tangs 34 also guide the electrical cables (not shown) to the connector body's leading end 24 and through the open area 84 of the cap 28.

Figure 14:
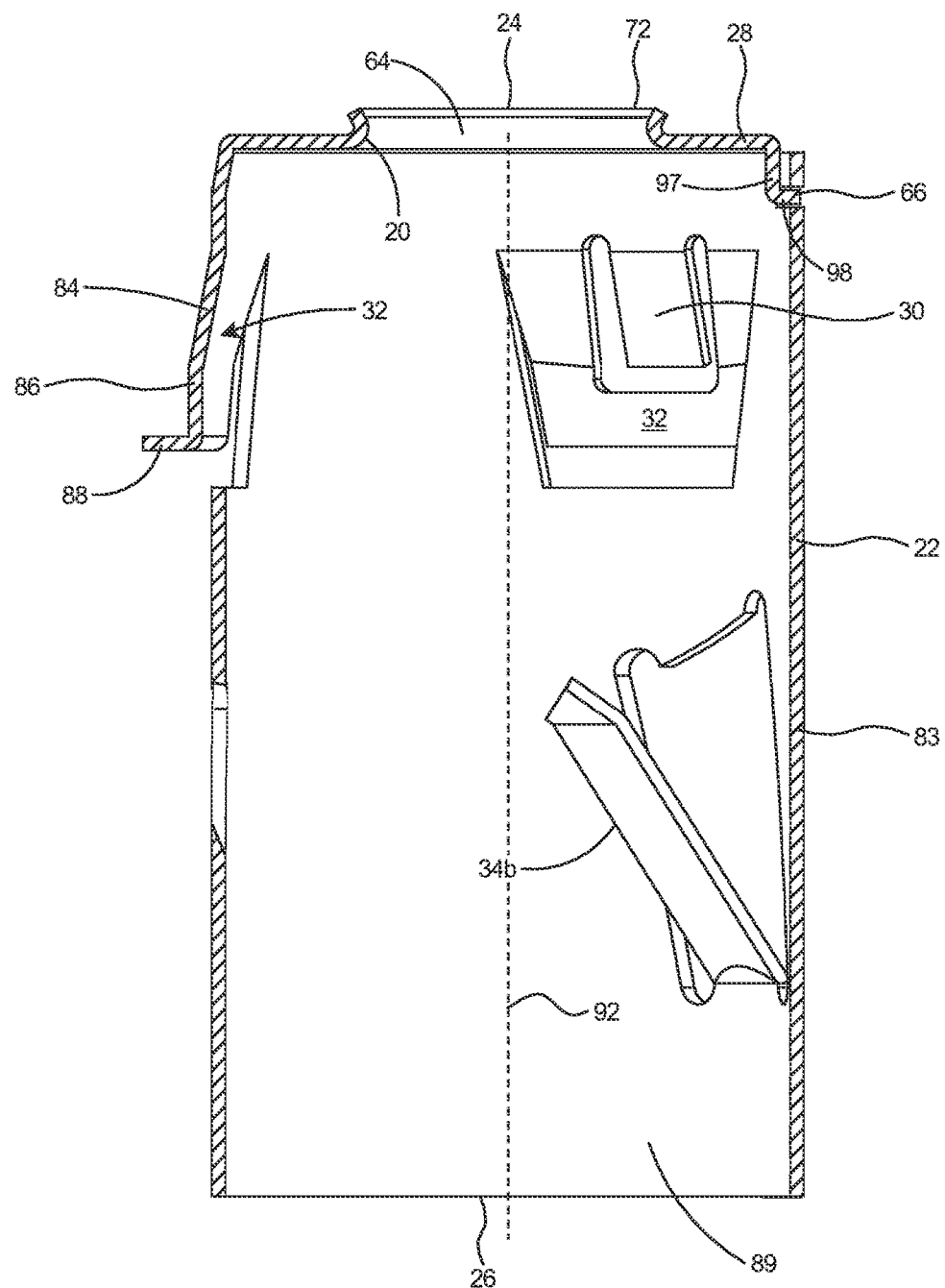
FIG. 14 is a sectional view of the one-piece electrical fitting of FIG. 1 taken along line 5-5 of FIG. 4 with the locking tang and window deleted to show the grounding tang.

Referring to FIG. 14, the connector body 22 is preferably of constant thickness and bore 89 is preferably of constant diameter from leading end 24 to trailing end 26. Opening 64 in cap 28 is substantially coaxial with center axis 92 of connector body 22. Tab 66 of cap 28 includes a first leg 97 extending substantially perpendicular from the cap 28 and a second leg 98 that is substantially parallel to the cap 28. As shown in FIG. 1, the blank that forms the connector body 22 is rolled into a complete cylindrical shape with no gap between the two edges 50 and 52 of the blank 36. Thus, the one-piece electrical fitting 20 is not a compressible fitting and avoids the inclusion of a split ring on the leading edge as used in other quick-connect fittings. The cap 28 includes an outer periphery 94 that is preferably of larger diameter than the outside diameter of the wall 83 of the connector body. Therefore, a portion of cap 28 overlaps the connector body wall 83.

Figure 15:
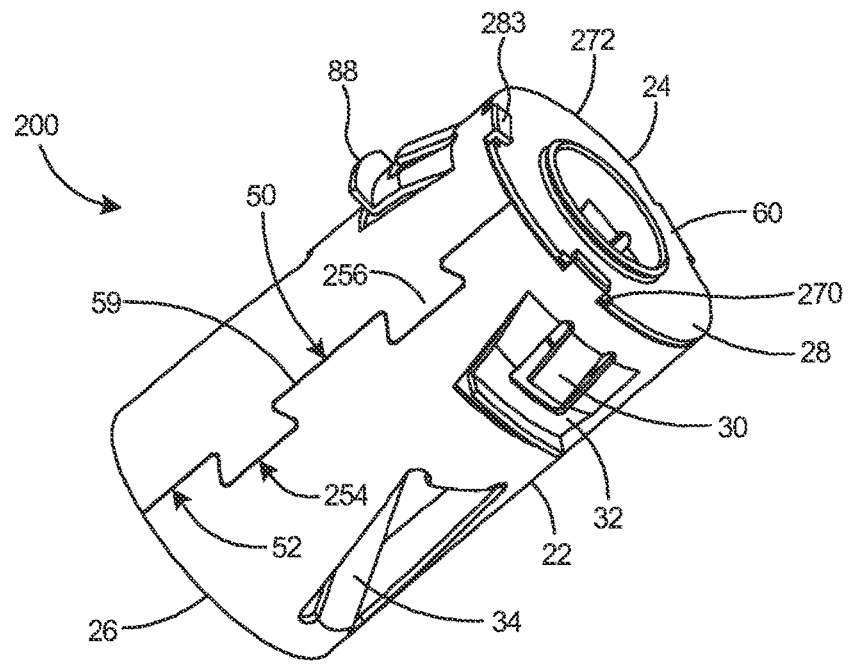
FIG. 15 is an isometric view of a one-piece electrical fitting according to a second and embodiment.
Figure 16:
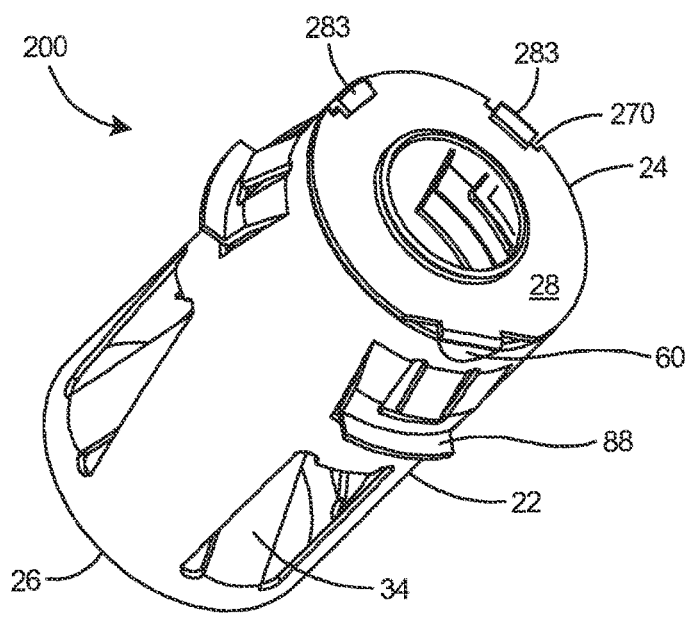
FIG. 16 is an isometric view of the one-piece electrical fitting of FIG. 15.

FIGS. 15 and 16 show another and preferred embodiment of a one-piece electrical fitting 200. Similar to the first embodiment 20, the one-piece electrical fitting 200 includes a one-piece cylindrical connector body 22, a longitudinal seam 59 at the joinder of two edges 50 and 52 of the connector body 22, and a cap 28. The two edges 50 and 52 of the body 22 are locked together by a dovetail tab 256 on the second edge 52 and a dovetail groove 254 on the first edge 50. The two edges 50 and 52 are joined in a flush, gap-free fit.

While dovetail tabs 256 and dovetail grooves 254 are shown in FIGS. 15 and 16, it will be appreciated that other shapes of tabs and corresponding grooves may be employed. This includes, for instance, T-shaped configurations—such as those shown in FIGS. 1 and 30, circular tabs with corresponding and circular grooves, or tabs in other geometric shapes with corresponding grooves. In another alternative arrangement, the two edges 50 and 52 may be connected by way of a hinged tab inserted into a slot.

Cap 28 extends from the connector body 22 by way of the hinge 60. The cap 28 further includes two notches 270 on its other periphery 272. Two tabs 283 extend from the connector body 22 and are bent over the cap 28 at the notches 270 to lock the cap to the connector body. In this embodiment, the cap 28 is substantially circular and does not have a tab 66. Nor does the connector body 22 have a leading edge slot 58 that is engaged by tab 66.

Figure 27:
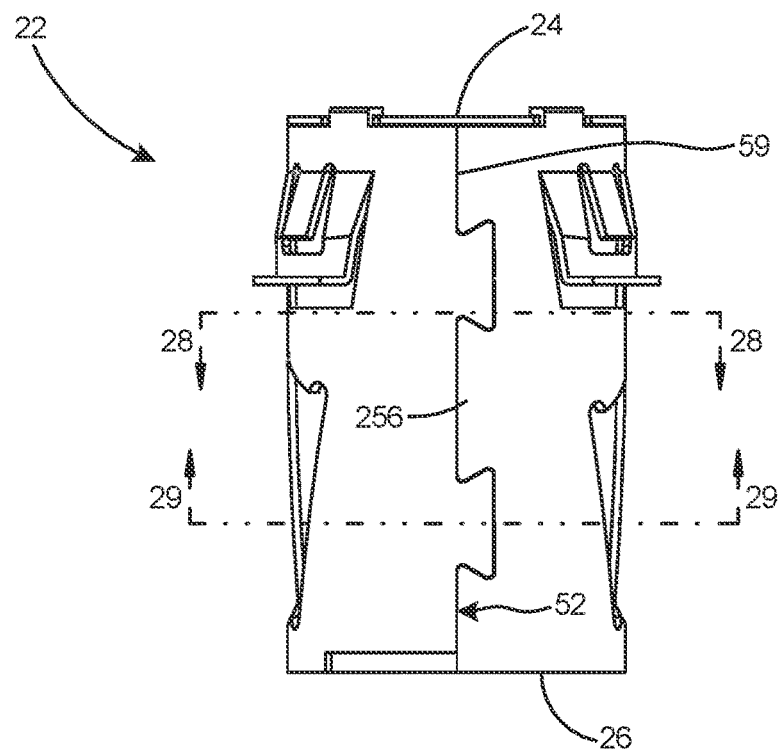
FIG. 27 is a side view of the one-piece electrical fitting of FIG. 15.

As shown in FIG. 27, longitudinal seam 59 runs from the trailing end 26 to the leading end 24. The tabs 256 at the longitudinal seam 59 match the radius of the cylindrical connector body 22 and the tabs 256 are flush with the outer surface (see FIG. 15) and the inner surface (see FIG. 30) of the connector body 22. Similar to the first embodiment, one or more grounding tangs 32 extend at different angles radially outward from the connector body 22. Locking tangs 30 extend from the interior of the base 85 of the grounding tangs 32. Grounding tangs 32 include a grounding flange 88 extending outward at another angle substantially perpendicular to the connector body 22, or parallel to the cap 28.

Figure 28:
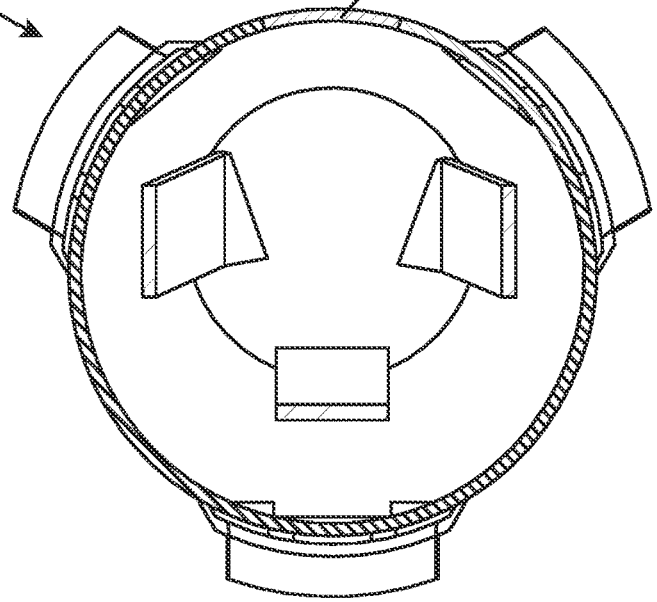
FIG. 28 is a sectional view of the one-piece electrical fitting of FIG. 27 taken along line 28-28.
Figure 29:
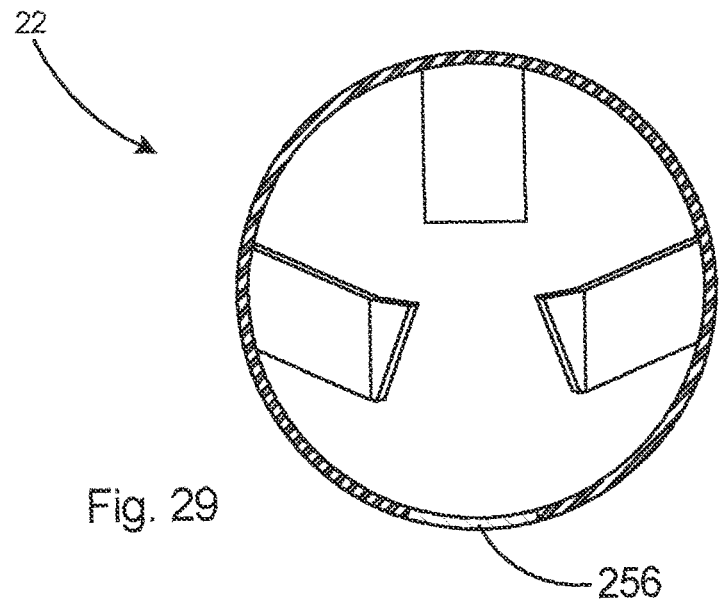
FIG. 29 is a sectional view of the one-piece electrical fitting of FIG. 27 taken along line 29-29.
Figure 30:
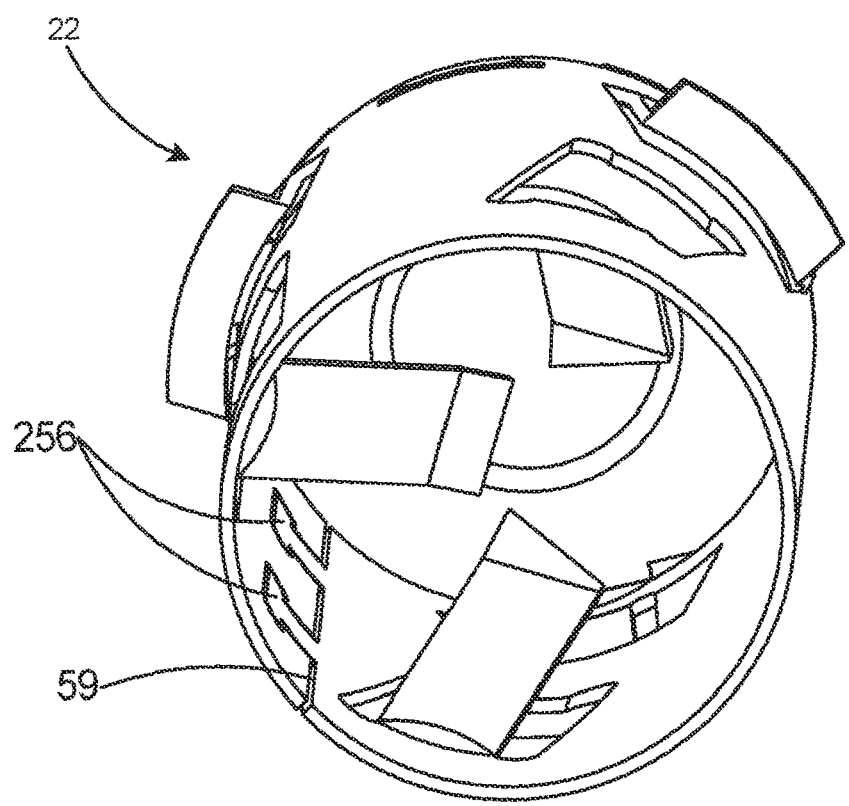
FIG. 30 is an isometric view of the one-piece electrical fitting of FIG. 1 as viewed from the trailing end.

As shown in FIGS. 28-30, one or more cable retaining tangs 34 extend radially inward from the connector body 22 into the bore in the same configuration as that described with respect to the first embodiment. The locking tangs 30 and grounding tangs 32 also similarly have outer ends with arcuate edges.

Figure 17:
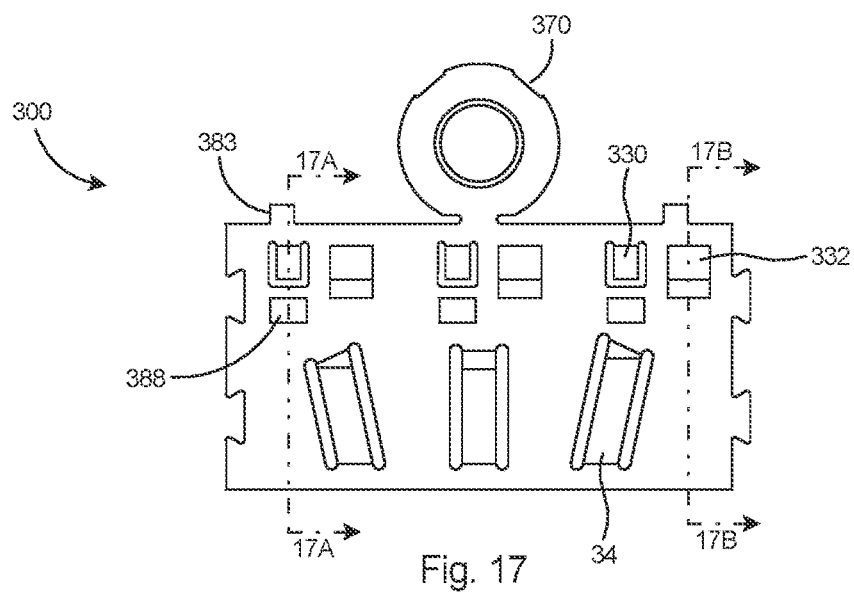
FIG. 17 is a plan view of a blank used to form a one-piece electrical fitting according to a third embodiment.
Figures 17A, 17B, 18:
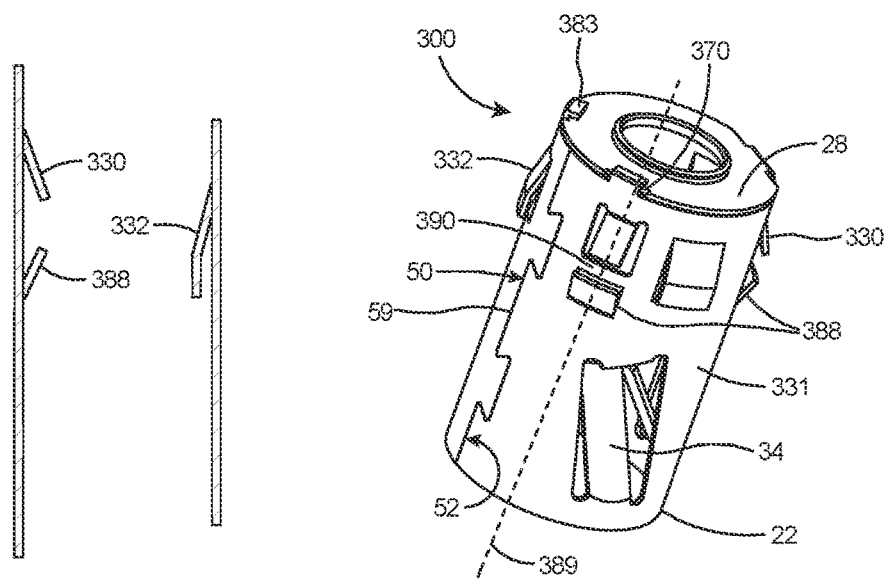
FIG. 17A is a sectional view of the blank taken along line 17A-17A of FIG. 17.
FIG. 17B is a sectional view of the blank taken along line 17B-17B of FIG. 17.
FIG. 18 is an isometric view of a one-piece electrical fitting according to the third embodiment as formed from the blank of FIG. 17.

FIGS. 17 and 18 show another embodiment of a one-piece electrical fitting 300. The locking tangs 330 are separate from the grounding tangs 332 and are spaced apart on the outer circumference 331 of the connector body 22. One or more flanges 388 are separate from the grounding tang 332. The flanges 388 are spaced around the outer circumference of the connector body 22. Each flange 388 is aligned longitudinally with a corresponding locking tang 330.

A seat 390 is included on the outer circumference of the connector body 22 between each locking tang 330 and its longitudinally aligned flange 388. Similar to the second embodiment, two tabs 383 on the connector body 22 are bent over the cap 28 at notches 370 to lock the cap to the connector body. The tabs 383 do not extend beyond the outer circumference 331 of the connector body 22. The one-piece electrical fitting 300 is formed from a single piece of sheet metal with corresponding features as shown in FIG. 17.

Figure 19:
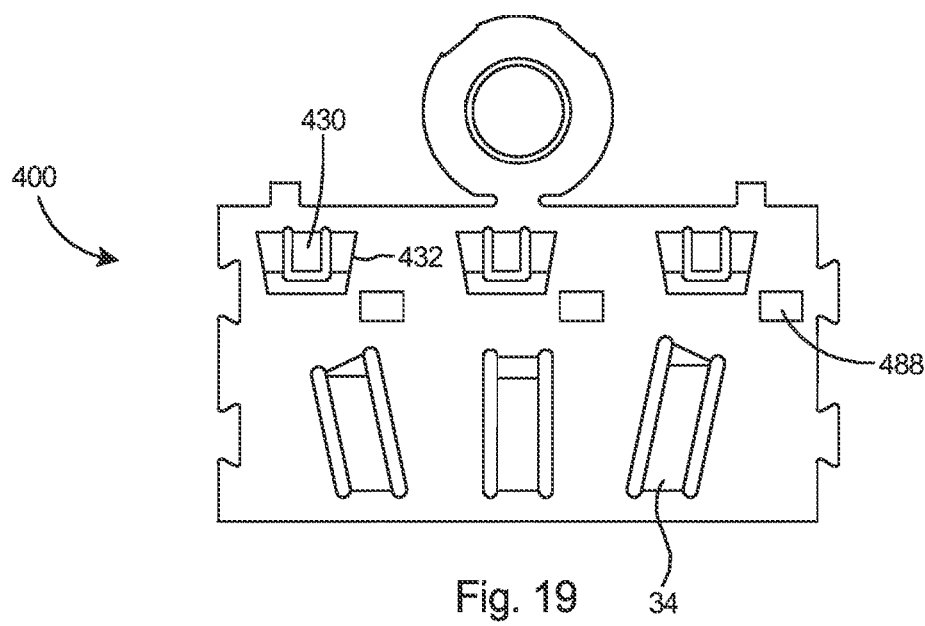
FIG. 19 is a plan view of a blank used to form a one-piece electrical fitting according to a fourth embodiment.
Figure 20:
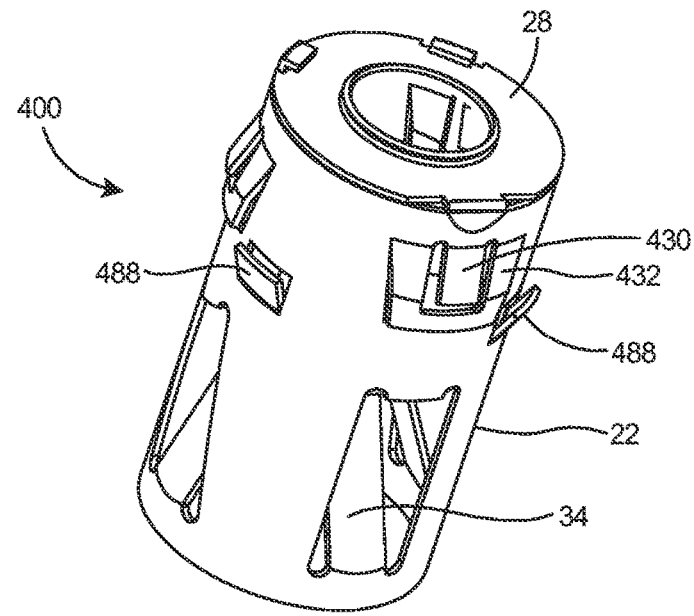
FIG. 20 is an isometric view of a one-piece electrical fitting according to a fourth embodiment as formed from the blank of FIG. 19.

FIGS. 19 and 20 show another embodiment of a one-piece electrical fitting 400. It includes a combination of locking and grounding tangs, with the locking tangs 430 extending from the interior base of the grounding tang 432. One or more separate Flanges 488 extend from the connector body 22 and are offset from the locking tangs 430 around the circumference of the connector body 22. When the electrical fitting 400 is installed in a knockout in an electrical box, the flanges 488 will stop the insertion of the connector body into the knockout. The one-piece electrical fitting 400 is formed from a single piece of sheet metal with corresponding features as shown in FIG. 19.

Figure 21:
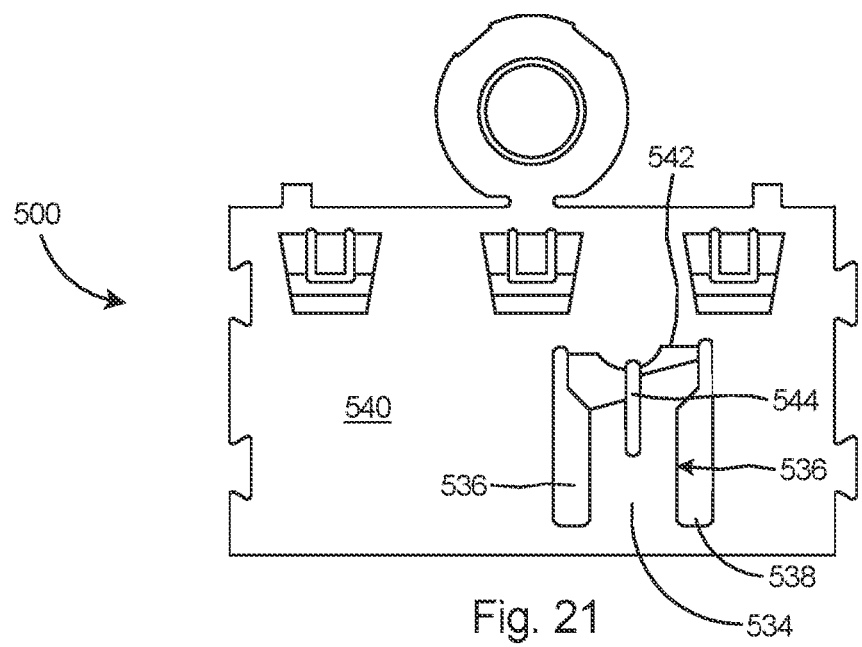
FIG. 21 is a plan view of a blank used to form a one-piece electrical fitting according to a fifth embodiment.
Figure 22:
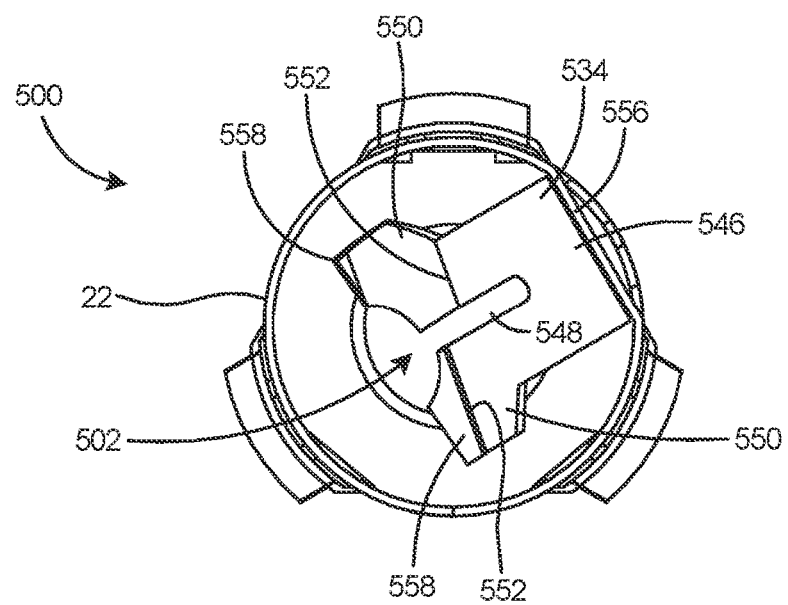
FIG. 22 is an end view from the trailing end of a one-piece electrical fitting according to a fifth embodiment as formed from the blank of FIG. 21.

FIGS. 21 and 22 show another embodiment of a one-piece electrical fitting 500. In this embodiment, a cable retaining arrangement 502 is formed from a single cable retaining tang 534 bent inward from the connector body 22. The cable retaining tang 534 includes two sides 536 formed by two long slots 538 in the blank 540 and a bifurcated end 542 formed by a slit 544 in the blank. The cable retaining tang 534 further includes a base 546, a slot 548 formed by slit 544 dividing the cable retaining tang into two arms 550, and a bend-line 552 on each arm 550. The cable retaining tang 534 extends from a flat wall portion 556 of the connector body 22. The bend lines for each arm 550 are offset at different distances from the flat wall portion 556. Each arm 550 of the cable retaining tang 534 includes an end portion 558.

Figure 23:
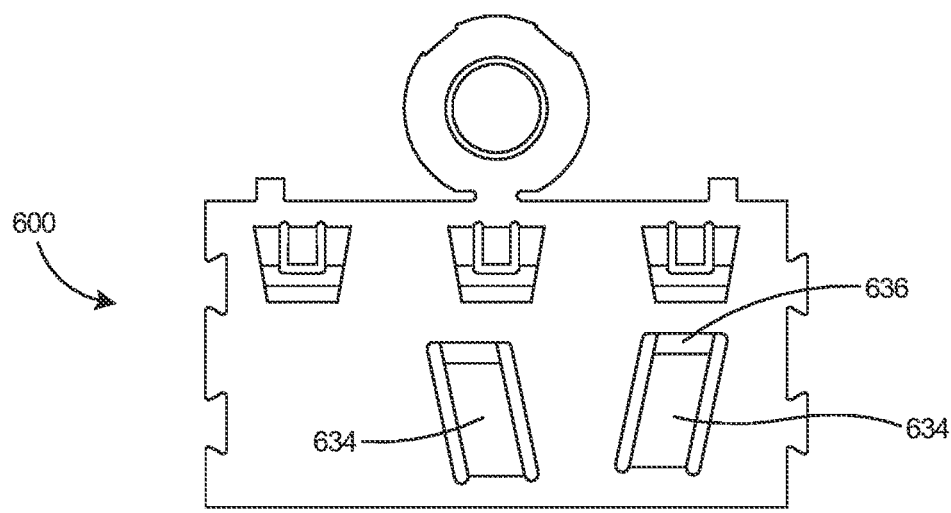
FIG. 23 is a plan view of a blank used to form a one-piece electrical fitting according to a sixth embodiment.
Figure 24:
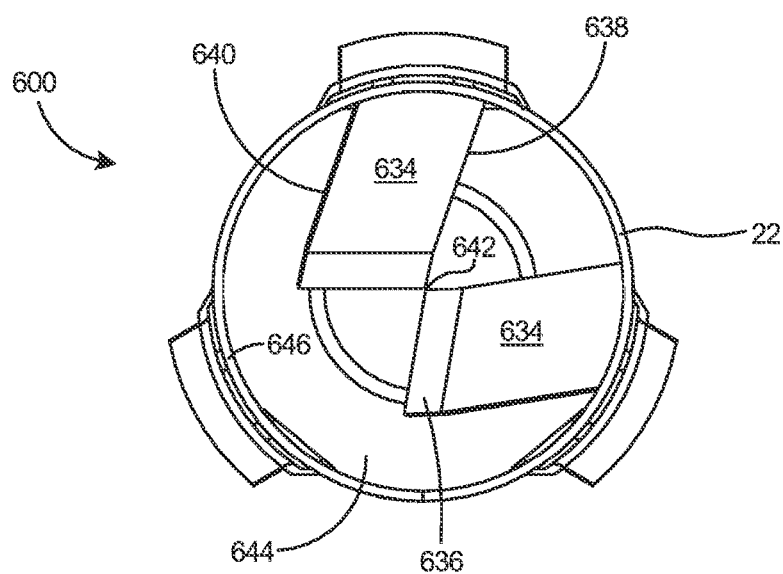
FIG. 24 is an end view from the trailing end of a one-piece electrical fitting according to a sixth embodiment as formed from the blank of FIG. 23.

FIGS. 23 and 24 show another embodiment of a one-piece electrical fitting 600. In this embodiment, two cable retaining tangs 634 extend inward from the connector body 22. The cable retaining tangs 634 each include an end portion 636, an inner side 638, and an outer side 640. The cable retaining tangs 634 extend inward from the connector body 22 at a first angle, while the end portions 636 extend from the cable retaining tangs 634 at a second angle. The inner sides 638 terminate in a point 642. The points 642 of the cable retaining tangs 634 engage one another in the inner bore 644 of the connector body 22. When electrical fitting 600 is connected to a junction box (not shown) and an electrical cable is inserted into the trailing end of the fitting, the cable retaining tangs 634 force the inserted cable against the far wall 646 of the connector body 22 and thus effect good electrical continuity or grounding of the electrical cable to the fitting and of the fitting to the junction box.

Figure 25:
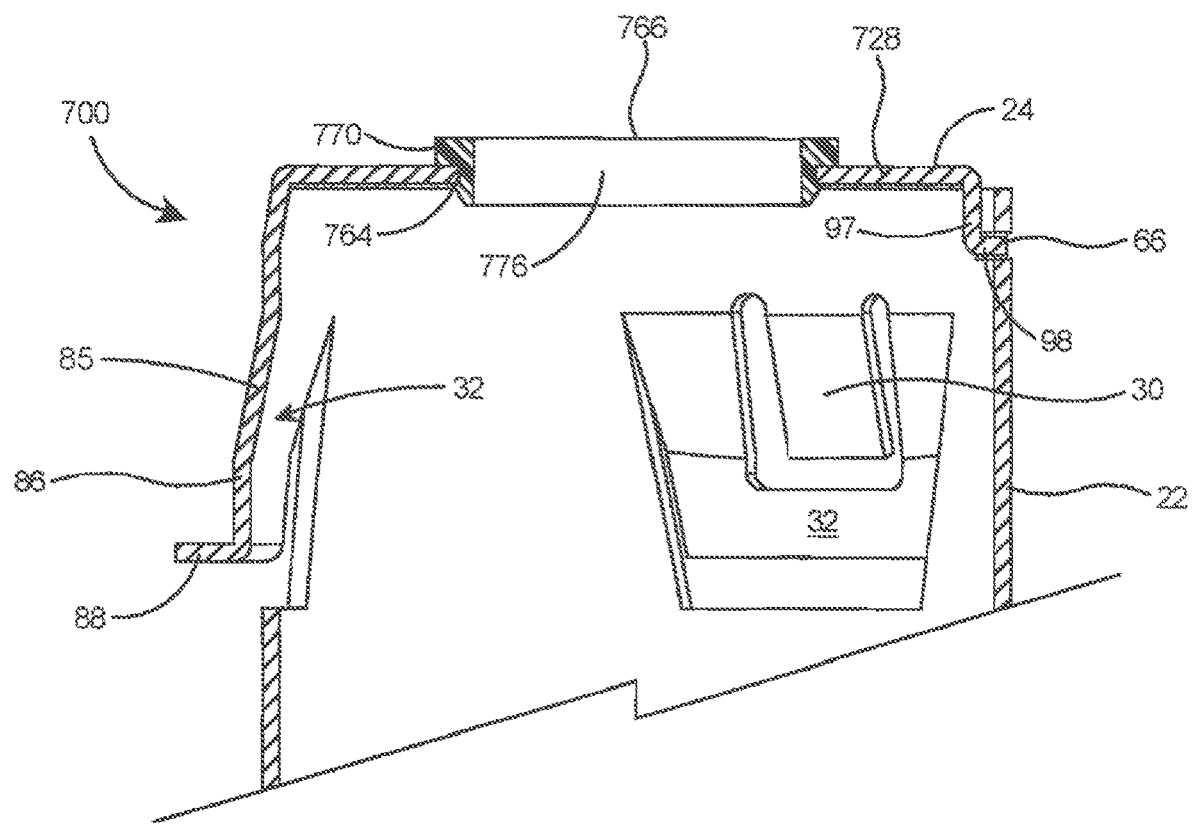
FIG. 25 is a sectional view of the leading end of a one-piece electrical fitting according to a further embodiment.
Figure 26:
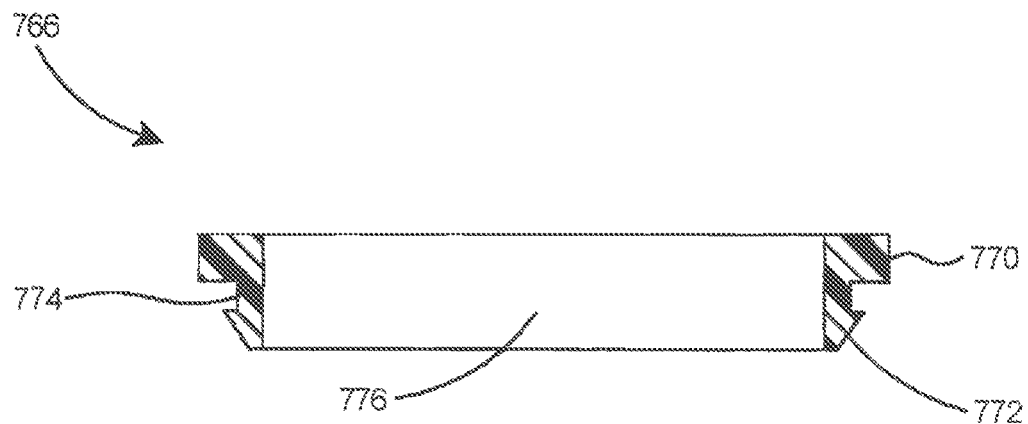
FIG. 26 is a sectional view of a tubular insert that forms a portion of the one-piece electrical fitting embodiment of FIG. 25.

FIGS. 25 and 26 show another embodiment of a one-piece electrical fitting 700. In the embodiment, the connector body 22 includes a cap 728 with an opening 764. A tubular insert 766 is inserted into the opening 764 and functions to provide a smooth, non-abrasive surface to protect the insulation of any conductors that are later inserted through the fitting and through the opening into a junction box (not shown). Outer circumference of insert 766 includes a leading flange 770 and a trailing flange 772 defining a recess 774 for accommodating the cap 728. Insert 766 further includes a throat 776 and is preferably constructed of plastic.

Figure 31:
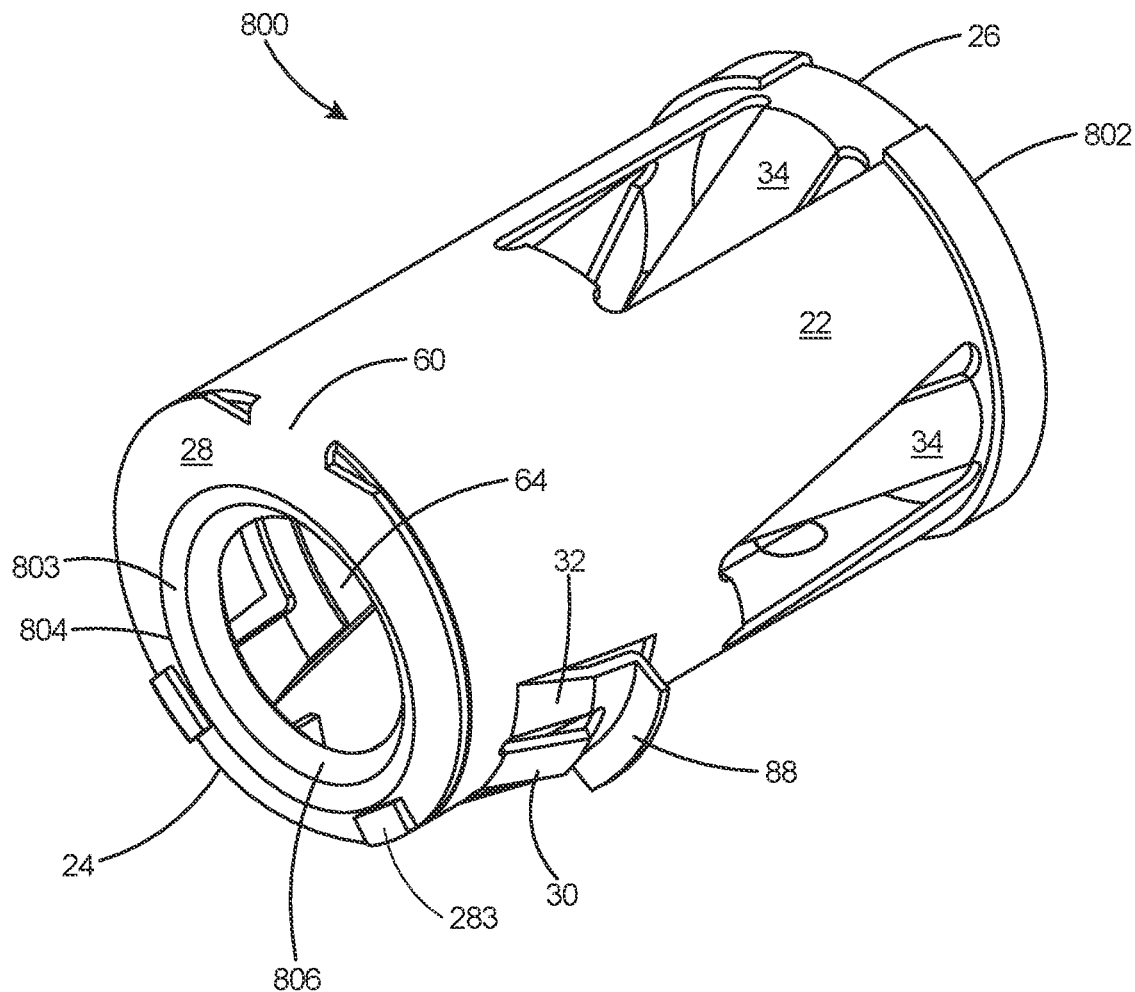
FIG. 31 is an isometric view of a one-piece electrical fitting according to an eighth embodiment.

With reference to FIG. 31, an eighth embodiment of the one-piece electrical fitting 800 includes a connector body 22 with a cap 28 on the leading end 24 of the fitting and a rolled edge 802 on the trailing end 26 of the fitting. The cap 28 includes an opening 64 therein. A recessed portion 803 extends around the inner periphery 804 of the cap surrounding the opening 64. The recessed portion 803 provides a lip 806 for mounting a plastic insert (not shown) therein. A portion of the trailing end is rolled outward to form a rolled edge 802 on the trailing end of the connector body 22 (see FIG. 35), thus creating a broader surface on the trailing end 26 to provide a better surface to assist manual insertion of the fitting into the knock-out of a junction box by pressing from the trailing end.

Figure 32:
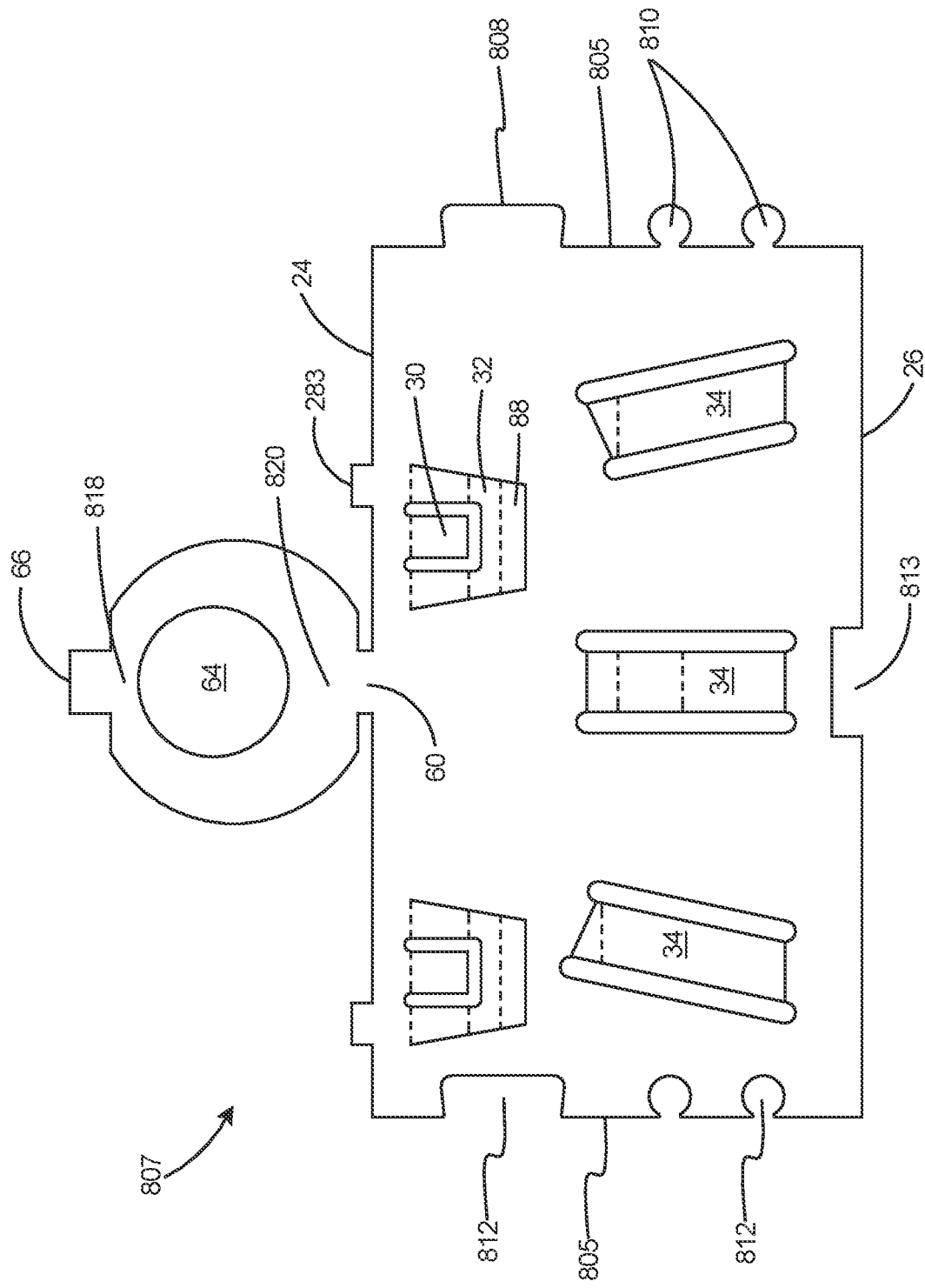
FIG. 32 is a plan view of a blank used to form the one-piece electrical fitting of FIG. 31.
Figure 33:
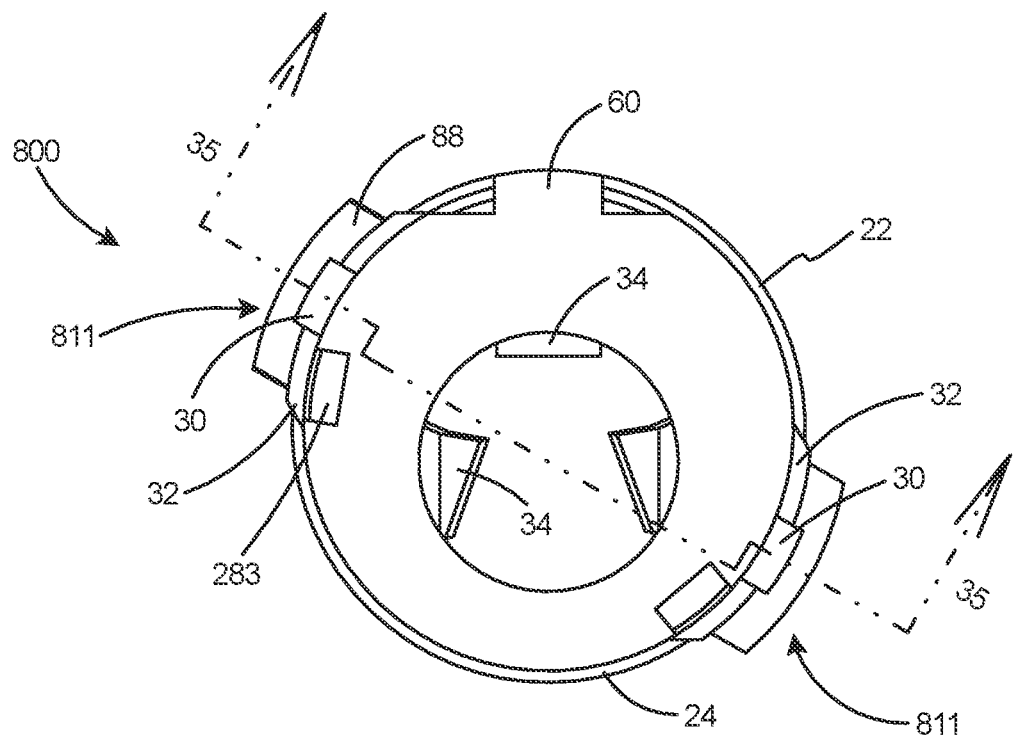
FIG. 33 is an end view of the one-piece electrical fitting of FIG. 31 from the leading end of the fitting.
Figure 34:
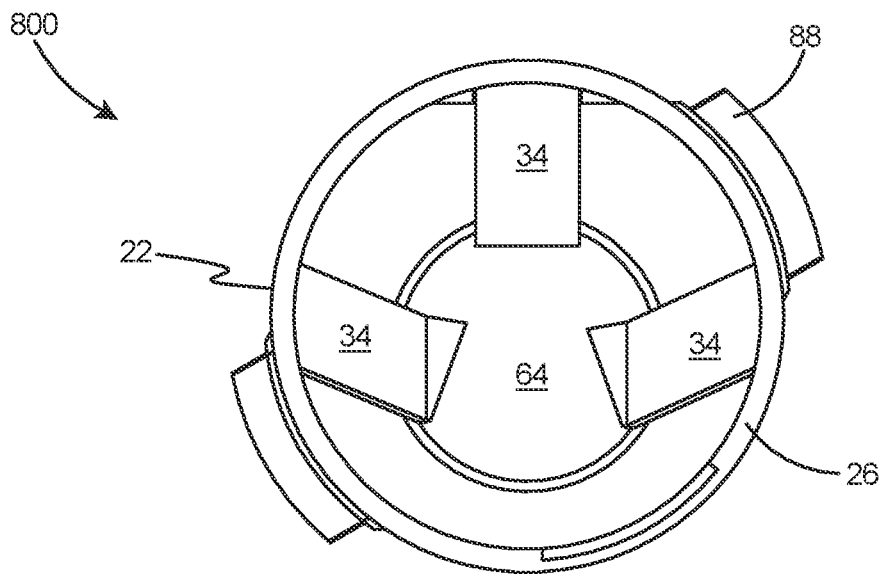
FIG. 34 is an end view of the one-piece electrical fitting of FIG. 31 from the trailing end of the fitting.

Referring to FIG. 32, the one-piece electrical fitting of FIG. 31 is formed from a single blank 807 constructed preferably of metal and rolled into a cylindrical shape in a forming operation. The blank 36 is formed from a flat metal sheet and includes a leading end 38 and a trailing end 40. The overall shape and portions of the blank are removed in a metal-stamping operation to form features in the eventual connector body. The blank includes edges 805 with edge tabs 808 and paired edge tabs 810 on a first edge locking into complementary edge slots 812 on the opposing edge in order to lock the flat blank into a cylindrical body portion. The blank 807 will be rolled into a cylindrical shape to form the fitting with opposing edges 805 of the blank fitting together with the edges 805 in a flush fit and edge tabs 808 and paired edge tabs 810 interlocked into edge slots 812. A notch 813 on the trailing end 38 is in longitudinal alignment with tab 66 and enables tab 66, after the cylindrical fitting body is formed, to be bent over the leading end of the cylindrical body at the notch 813. As shown in FIG. 33, two combination tangs 811 including locking tangs 30 and grounding tangs 32 are positioned 180 degrees apart radially on the fitting body to facilitate easier snap-in insertion into the knockout hole of an electrical box.

Figure 35:
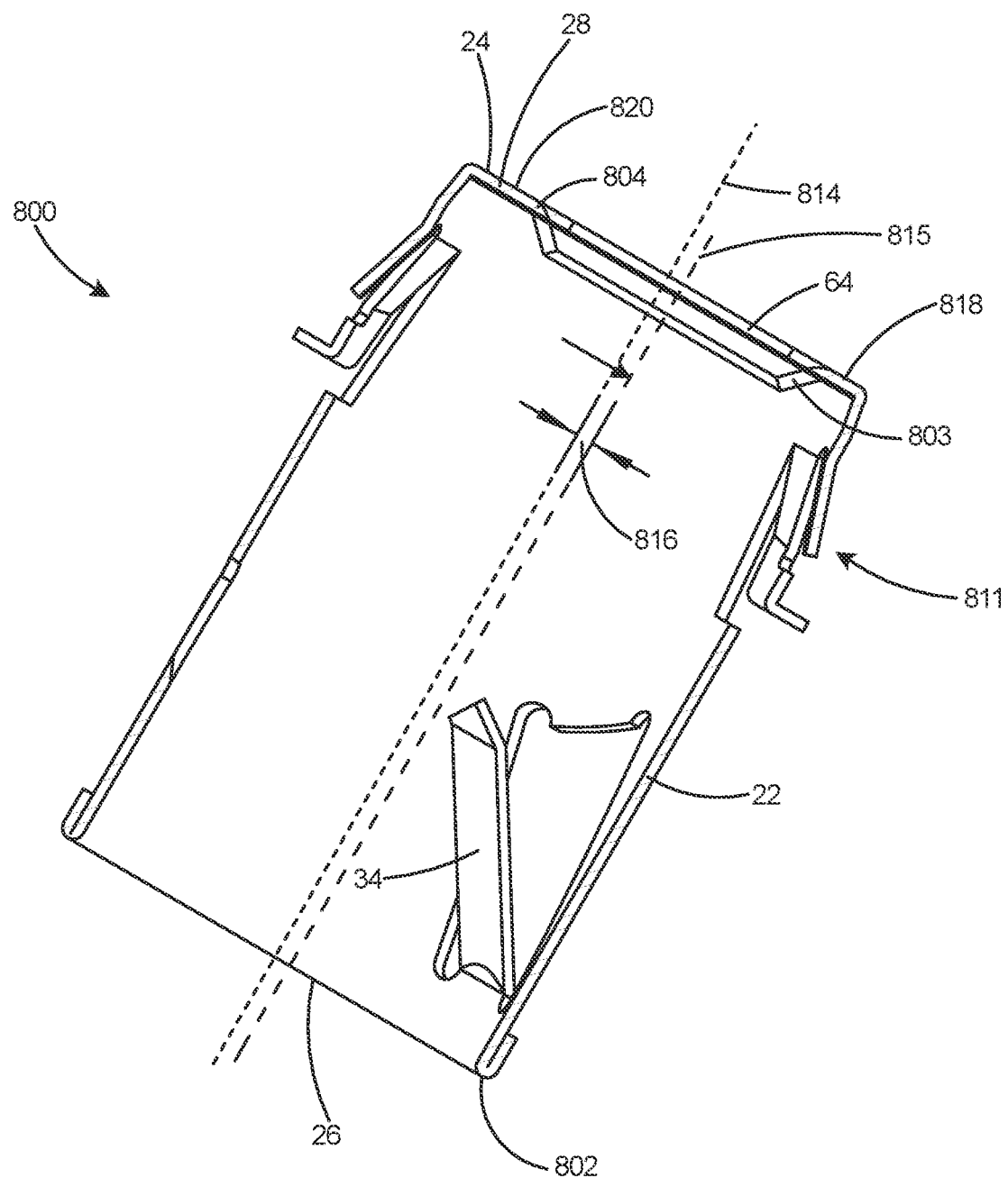
FIG. 35 is a sectional view of the one-piece electrical fitting taken along line 35-35 of FIG. 33.
Figure 36:
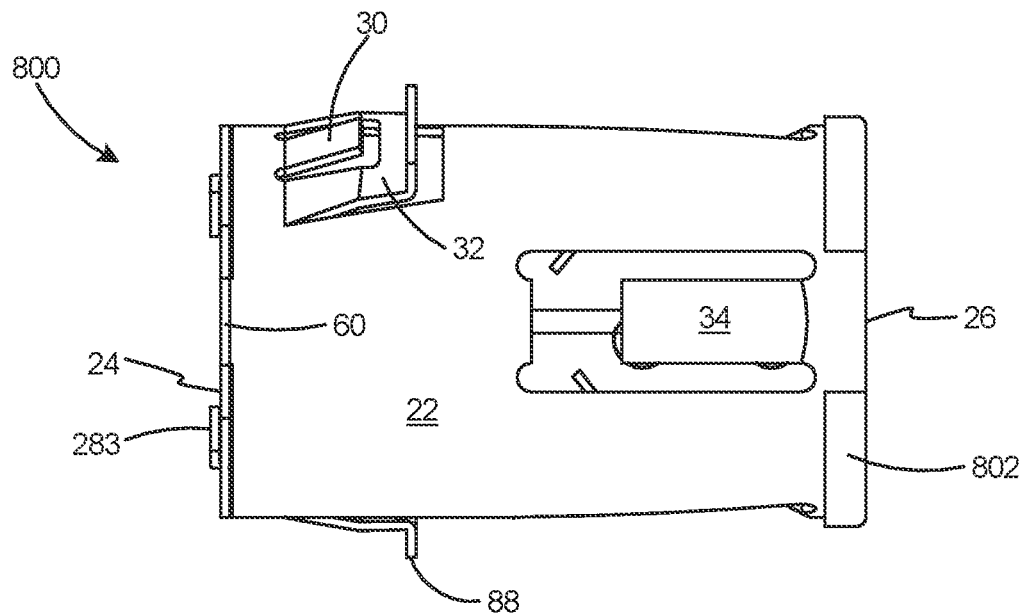
FIG. 36 is a side view of the one-piece electrical fitting, as viewed from the top of FIG. 31.
Figure 37:
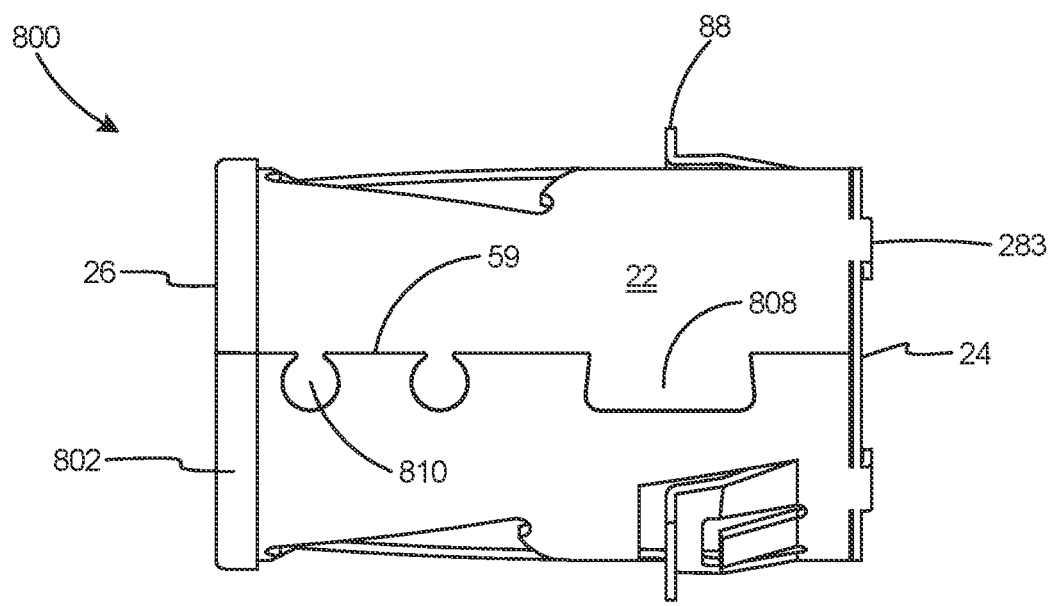
FIG. 37 is a side view of the one-piece electrical fitting, as viewed from the bottom of FIG. 31.

With reference to FIG. 35, the one piece electrical fitting 800 includes a central axis 814 of fitting and a central axis 815 of the opening or exit bore 64. The central axis 815 of the exit bore 64 is offset by distance 816 from the central axis 814 of the fitting. The offset of the exit bore 64 creates a narrow aspect 818 and a wide aspect 820 of the cap 28 such that the exit bore 64 is offset to one side of the cap 28. When a cable (not shown) is later inserted into the fitting at the trailing end, the cable retaining tangs 34, one of which is visible in FIG. 35 push or direct a cable toward the exit bore 64 and toward the narrow aspect 818 side of the cap 28.

Figure 38:
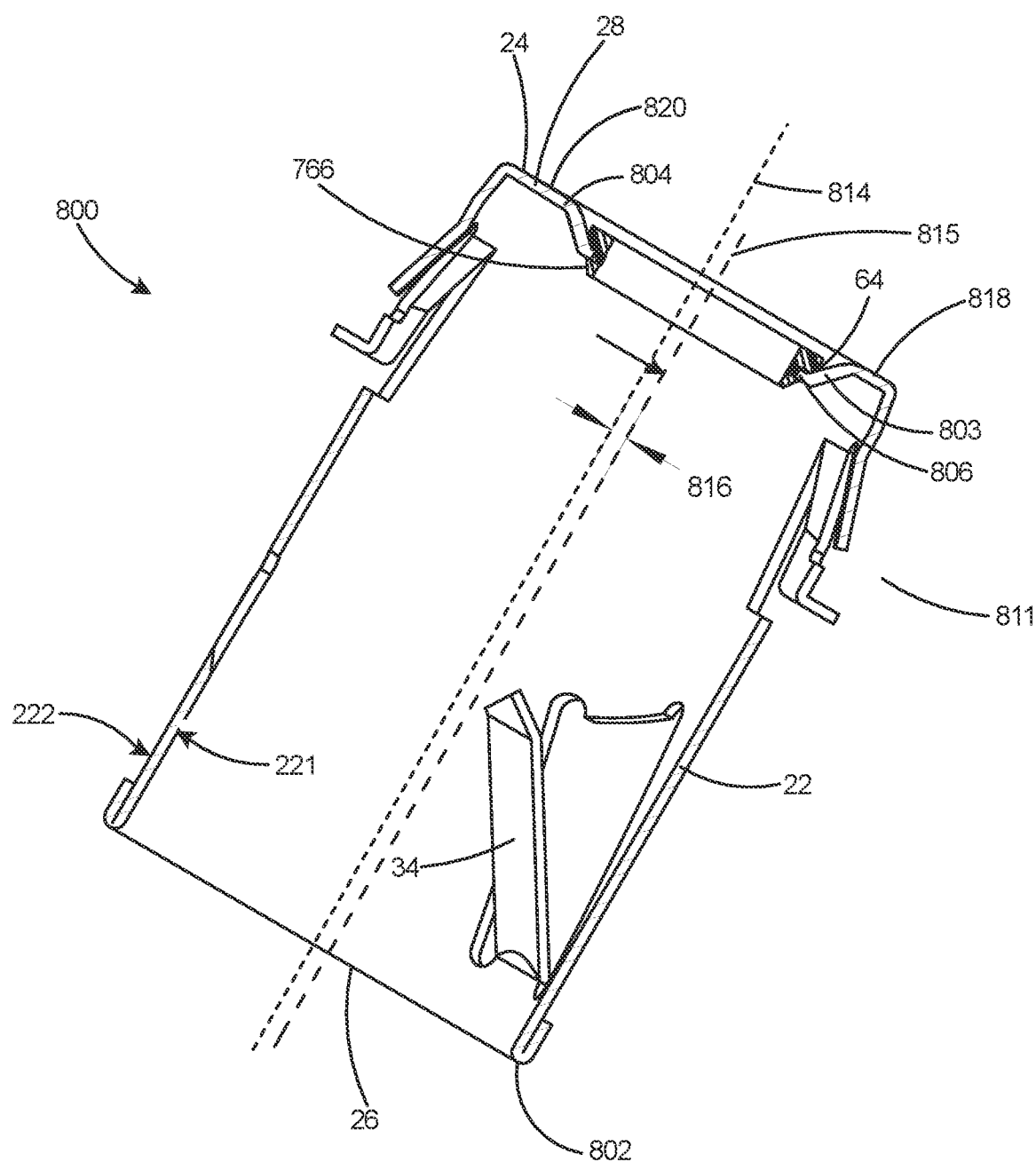
FIG. 38 is a sectional view of the one-piece electrical fitting taken along line 35-35 of FIG. 33 and showing an insert seated in the exit bore of the fitting.

Referring to FIG. 38, electrical fitting 800 is shown with a tubular insert 766, which is press fitted into the exit bore of the fitting and will function as an insulating liner when installing electrical wiring through the fitting. The insert 766 seats within the exit bore 64 and snap fits onto the lip 806 on the recessed portion 803 of the connector body 22. The insert is most preferably formed of an elastomeric material, such as plastic, which will provide a non-abrasive throat in the exit bore to prevent abrasion of wiring conductors that are inserted through the exit bore during installation of the electrical fitting. The rolled edge 802 is rolled from the inner circumference 821 of the connector body 22 to the outer circumference 822 of the connector body.

Figure 39:
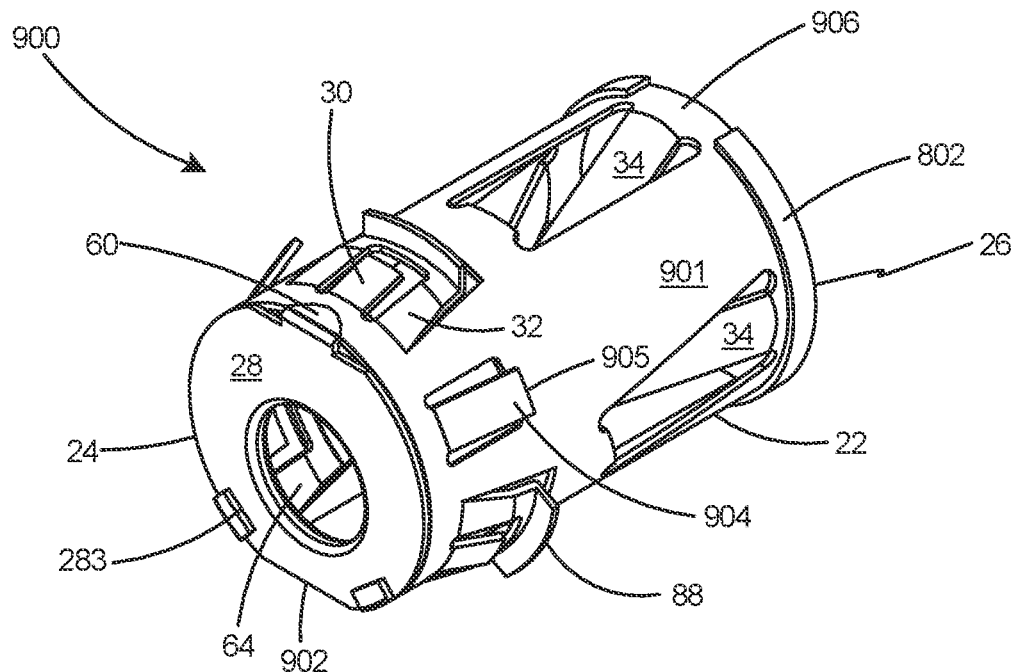
FIG. 39 is an isometric view of a ninth embodiment of the one-piece electrical as viewed from the leading end.
Figure 40:
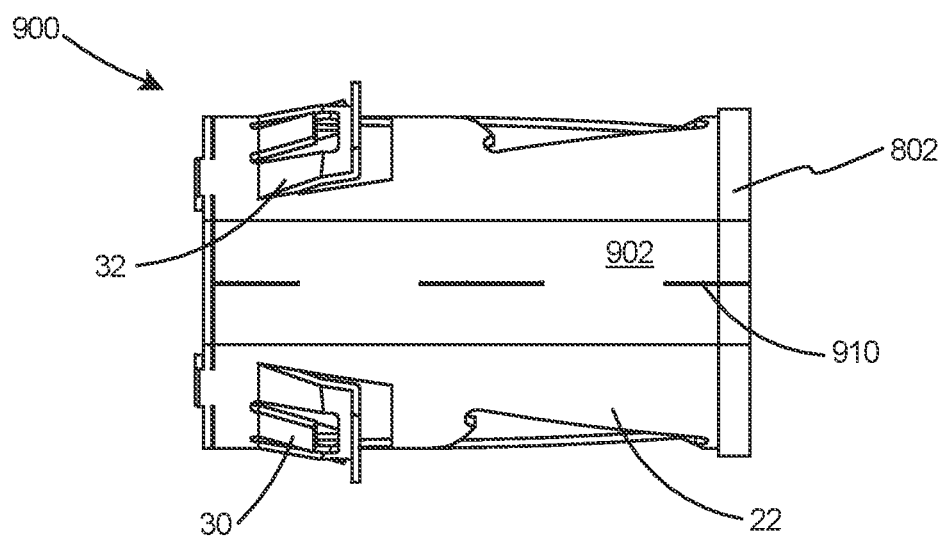
FIG. 40 is a side view of the one-piece electrical fitting of FIG. 39.

With reference to FIGS. 39 and 40, a ninth and preferred embodiment of the one-piece electrical fitting 900 includes a connector body 22 with a cap 28 on the leading end 24 of the fitting. The connector body 22 includes a cylindrical portion 901 and a flat portion 902. Grounding tangs 32 and locking tangs 30 extend radially outward from the cylindrical portion 901 of the connector body. The cap 28 includes an opening 64 therein. A portion of the trailing end 26 of the connector body 22 is rolled outward to form a rolled edge 802, thus creating a broader surface on the trailing end to provide a better surface to assist manual insertion of the fitting into the knock-out of a junction box by pressing from the trailing end. The flat portion 902 extends along the length of the connector body from the leading end 24 to the trailing end 26. The one-piece electrical fitting 900 further includes one or more auxiliary grounding tangs 904 extending outward radially from the cylindrical portion 901 of the connector body. Auxiliary grounding tangs 904 include ends 905. Each auxiliary grounding tang 904 is located between and substantially equidistant from adjacent grounding tang 32. The trailing end 26 of the connector body 22 includes a trailing end gap 906 that does not include the rolled edge 802.

Figure 41:
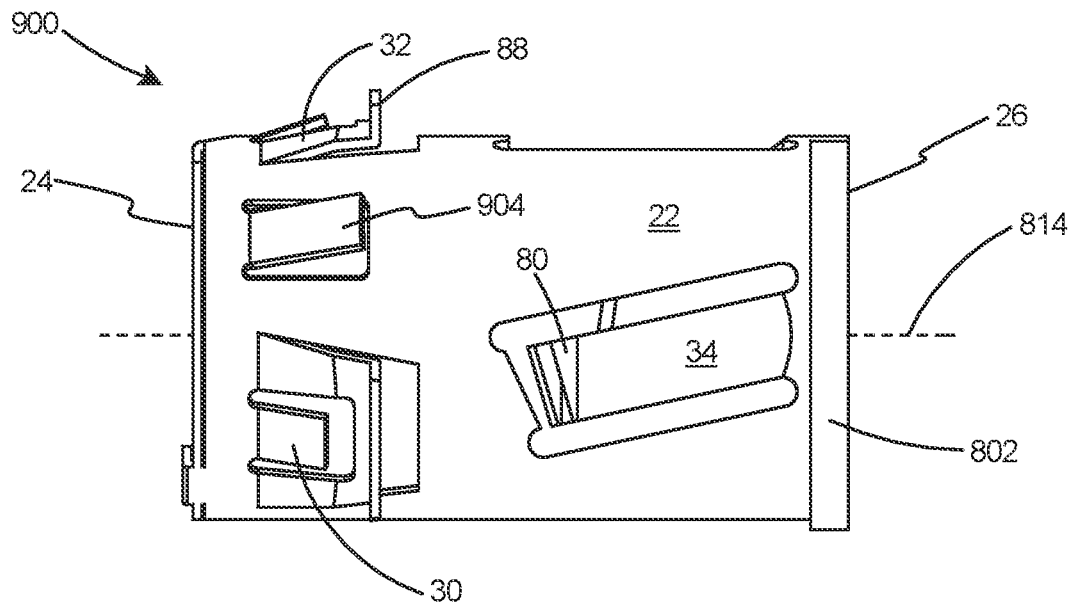
FIG. 41 is a side view of the one-piece electrical fitting of FIG. 39 rotated at 90° with respect to the view shown in FIG. 40.
Figure 42:
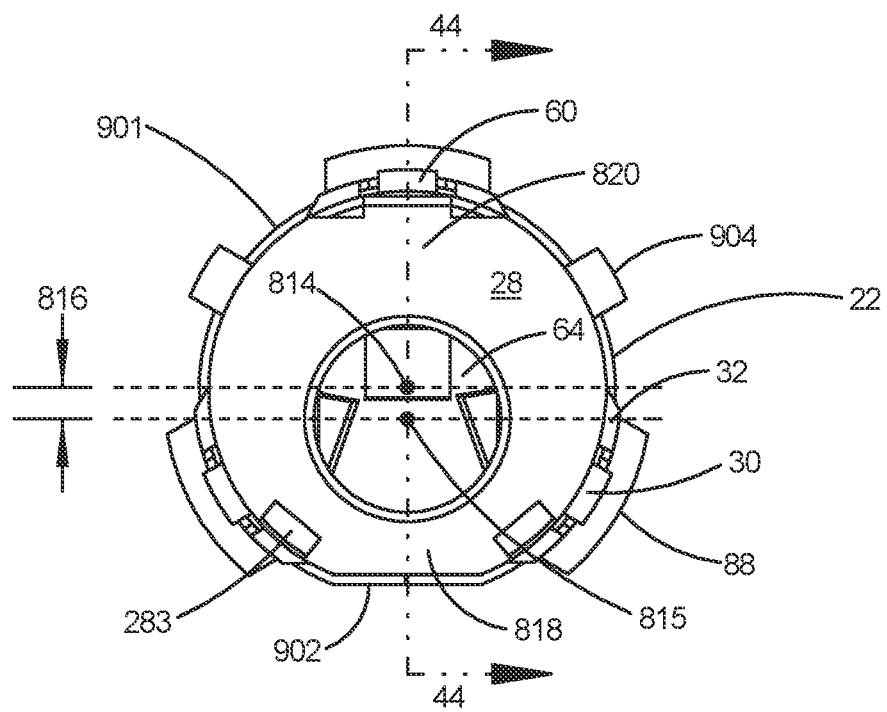
FIG. 42 is an end view of the one-piece electrical fitting of FIG. 39, as viewed from the leading end of the fitting.

Referring to FIGS. 41 and 42, the one-piece electrical fitting of FIG. 39 includes a central axis 814 and a central axis 815 of the exit bore 64. The central axis 815 of the exit bore 64 is offset by distance 816 from the central axis 814 of the fitting. As shown in FIG. 42, the offset of the exit bore 64 creates a narrow aspect 818 and a wide aspect 820 on the cap 28 such that the exit bore 64 is offset to one side of the cap 28. The exit bore 64 is offset toward the flat portion 902 of the electrical fitting. When a cable (not shown) is later inserted into the fitting at the trailing end, the cable retaining tangs 34 push or direct a cable toward the exit bore 64 and toward the narrow aspect 818 side of the cap 28.

Figure 43:
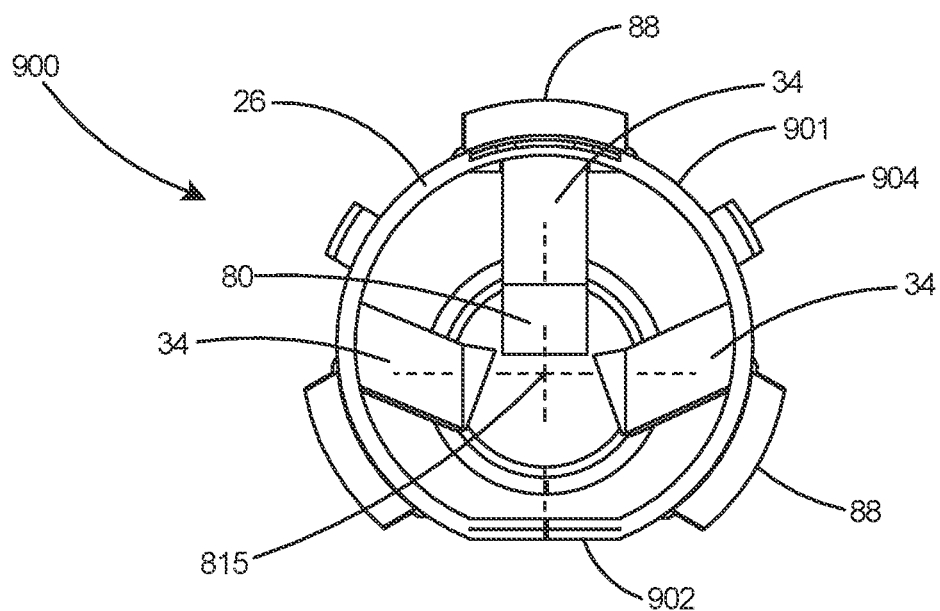
FIG. 43 is an end view of the one-piece electrical fitting of FIG. 39, as viewed from the trailing end of the fitting.
Figure 44:
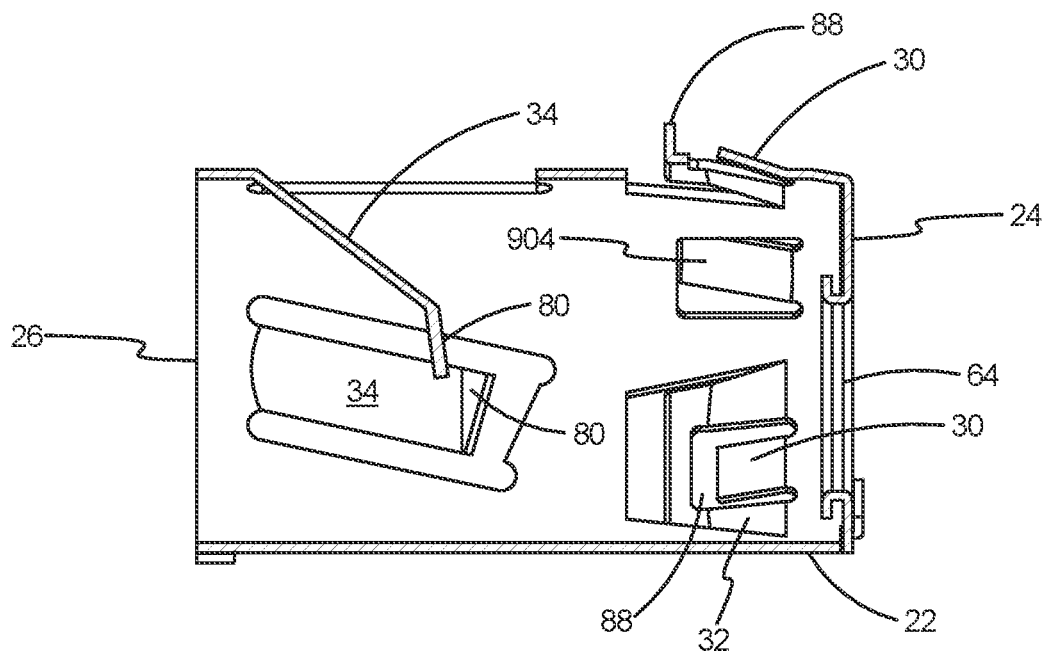
FIG. 44 is a sectional view of the one-piece electrical fitting taken along line 44-44 of FIG. 42.

Referring to FIGS. 43 and 44, the flat portion 902 of the connector body 22 is located 180° radially across the connector body from the cylindrical portion 901. End portions 80 of cable retaining tangs 34 push or direct a cable (not shown) toward the exit bore 64 of the fitting.

Figure 45:
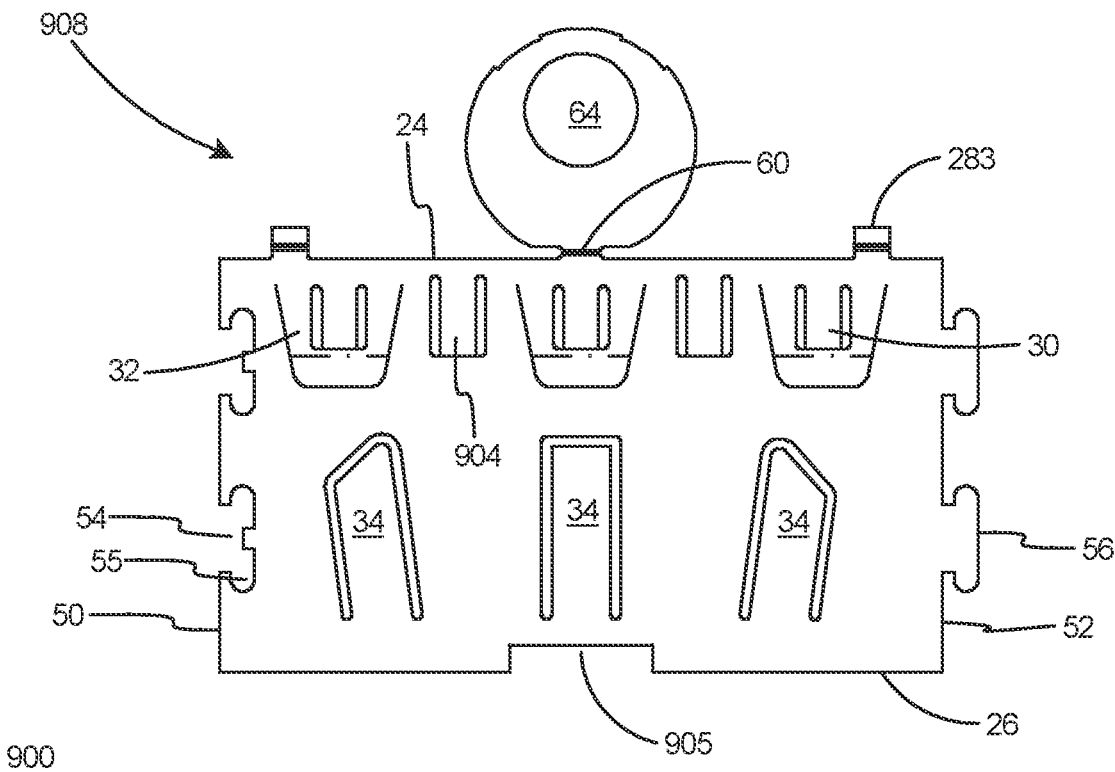
FIG. 45 is a plan view of a blank used to form the one-piece electrical fitting of FIG. 39.
Figure 46:
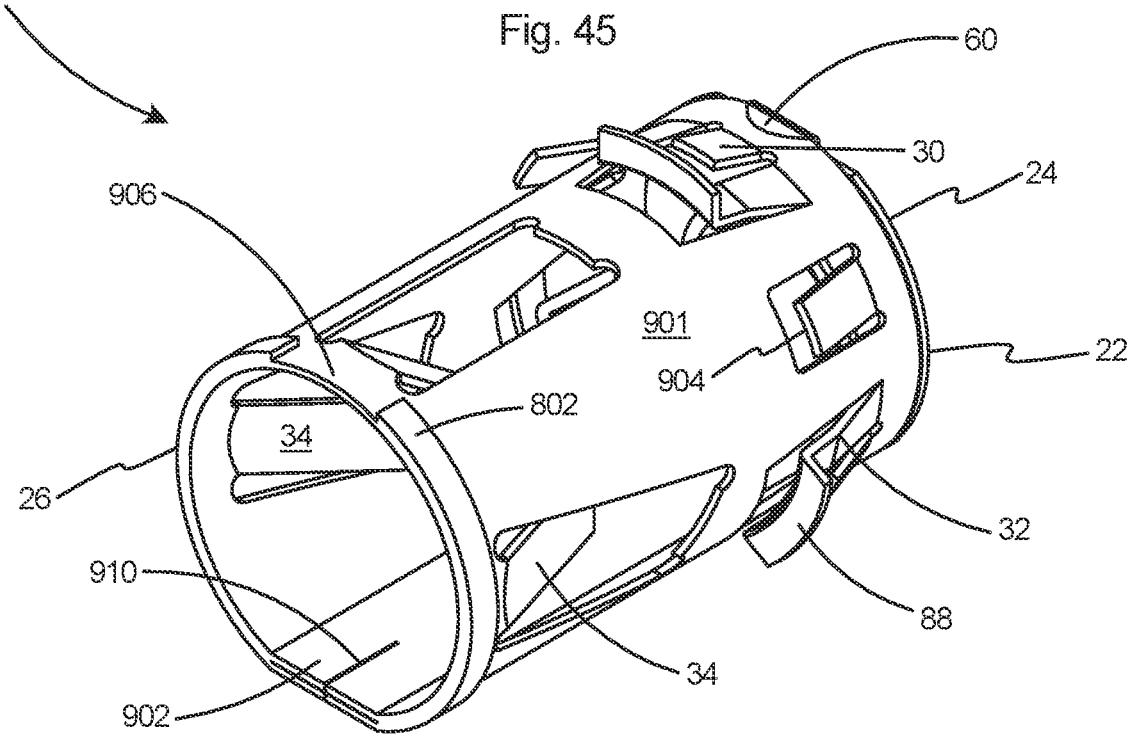
FIG. 46 is an isometric view of the one-piece electrical fitting of FIG. 39 as viewed from the trailing end.

With reference to FIGS. 45 and 46, the one piece electrical fitting is formed from a single blank 908 constructed preferably of metal and rolled into a partially cylindrical shape in a forming operation. The blank 908 is stamped from a flat metal sheet and includes a leading end 24, a trailing end 26, and two edges 50 and 52. The blank 908 will be rolled into a tubular shape including a cylindrical portion 901 and a flat portion 902 extending longitudinally along the connector body 22. The two edges 50 and 52 are joined at a longitudinal seam 910 through a flush, gap-free locking arrangement of tabs 56 extending from the second edge 52 and corresponding slots or grooves 54 in the first edge 50. The longitudinal seam 910 is on the flat portion 902 of the connector body 22.

Figure 47:
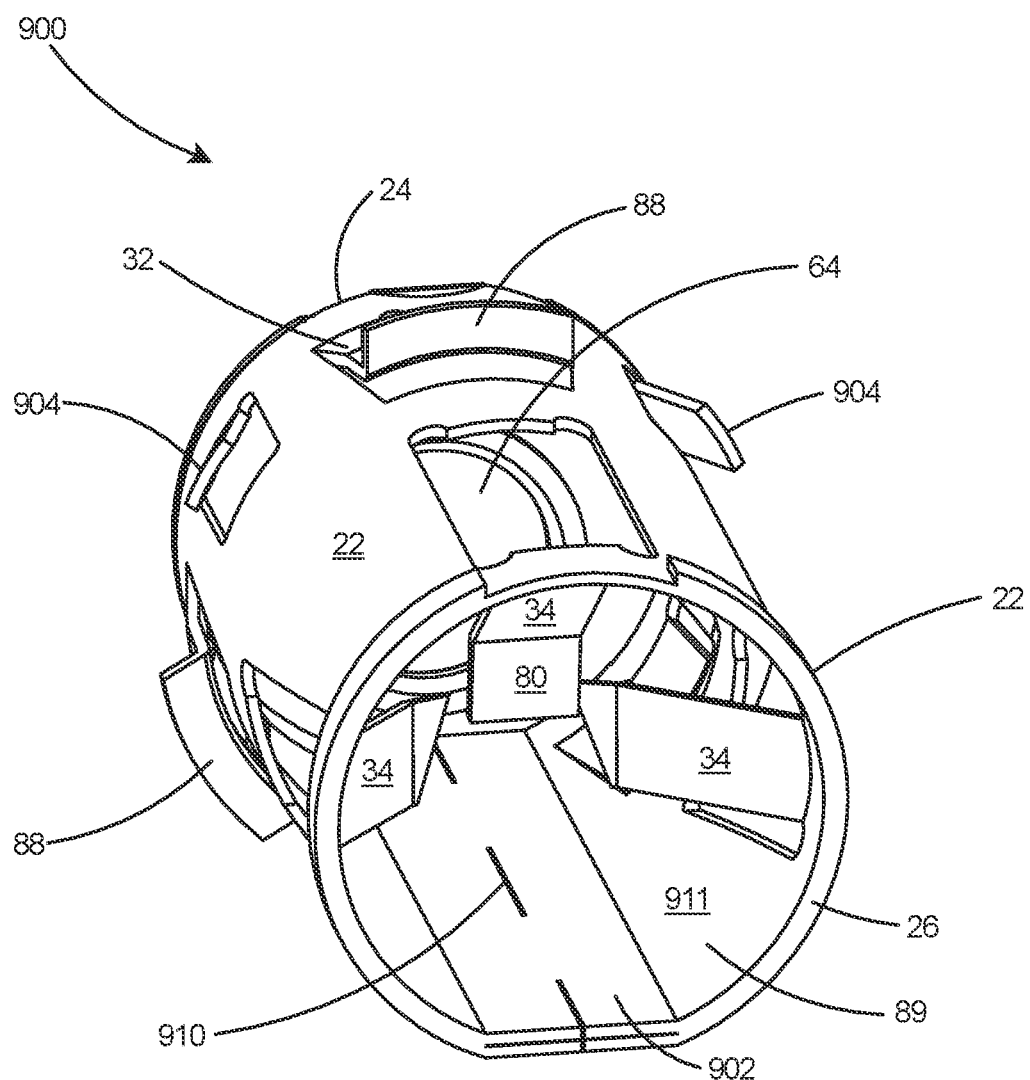
FIG. 47 is an isometric view of the one-piece electrical fitting of FIG. 39 as viewed from the trailing end.

With reference to FIG. 47, the connector body 22 preferably includes three cable retaining tangs 34 extending into the inner bore 89 from the inner walls 911 of the connector body. The cable retaining tangs 34 will guide an inserted cable to the exit bore 64 at the leading end 26 of the connector body 22.

Figure 48:
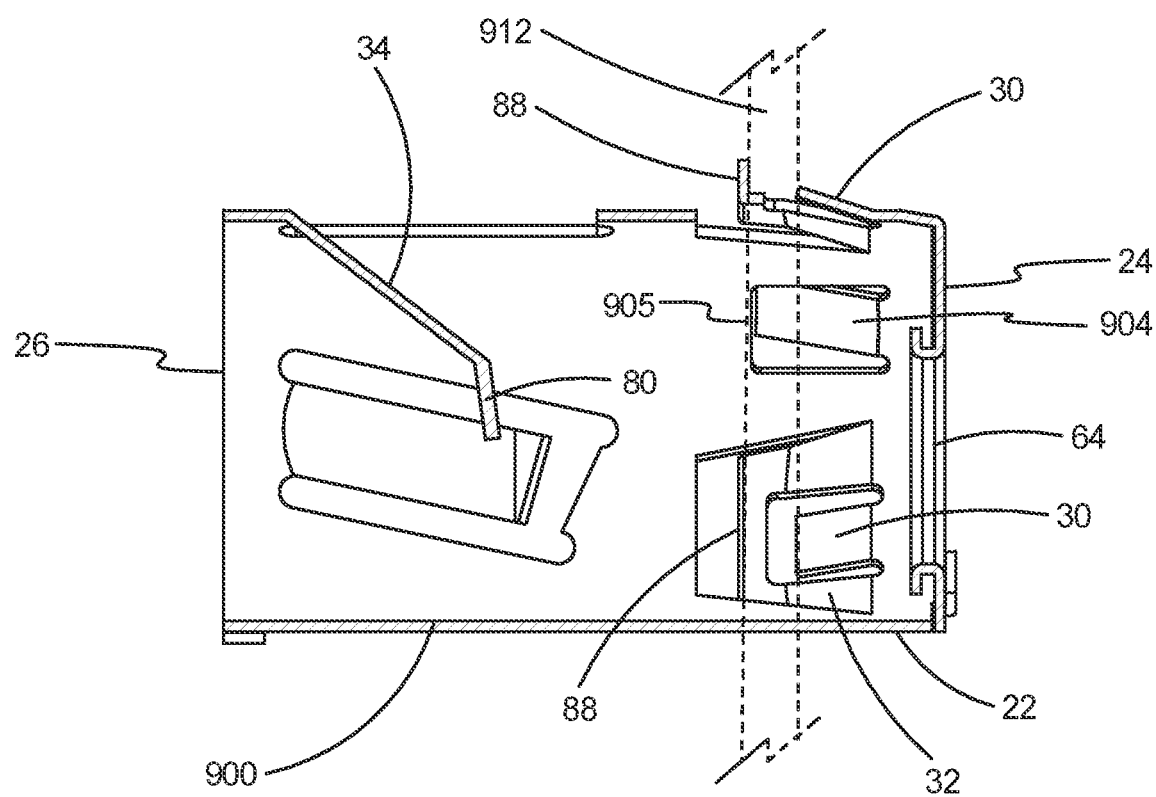
FIG. 48 is a sectional view of the one-piece electrical fitting shown inserted through a knockout of an electrical box.

Referring to FIG. 48, when fully inserted through the knockout aperture of an electrical box wall 912, the one-piece electrical fitting 900 will be locked within the aperture by the locking tangs 30. The flanges 88 of the grounding tangs 32 will be in firm engagement with the wall 912 of the electrical box and the ends 904 of the auxiliary grounding tangs 904 will be in firm engagement with the electrical box wall surrounding the knockout aperture. Thus, electrical grounding of the connector to the box or electrical continuity, will be enhanced by the addition of the auxiliary tangs 904 to the electrical fitting 900.

The present one-piece electrical fittings offer advantages over other quick-connect fitting in several ways, including that they are easier to manufacture and may be manufactured at a lower unit cost. As described hereinabove, the one-piece electrical fittings may be stamped from a flat piece of metal and formed into a cylindrical shape with the tangs bent in their respective direction and the cap bent over to form the leading end of the fitting.

Several types of electrical cable and conduit can be connected to a junction box with these one-piece electrical fittings, including MC/HCF steel or aluminum cable, AC/HCF steel or aluminum cable, flexible metal conduit steel and aluminum, including both regular and reduced wall thickness, and MC cable continuous corrugated aluminum.

Although the description above contains many specific descriptions, materials, and dimensions, these should not be construed as limiting the scope of the inventions, but as merely providing illustrations of some embodiments.

What is claimed is:

1. A one-piece electrical fitting, comprising:
    a tubular connector body having a leading end, a trailing end, a central axis, and a trailing bore, said tubular connector body having a constant diameter from said leading end to said trailing end;
    a grounding tang extending outwardly from the tubular connector body;
    a locking tang extending from the interior of the grounding tang;
    a cap including an exit bore;
    one or more cable retaining tangs to direct an electrical cable from the trailing bore to the exit bore; and
    one or more auxiliary grounding tangs on said tubular connector body.

2. The one-piece electrical fitting of claim 1, comprising a single longitudinal seam on said connector body.

3. The one-piece electrical fitting of claim 1, comprising:
    said exit bore includes a central axis; and
    said central axis of said exit bore is offset from said central axis of said connector body.

4. The one-piece electrical fitting of claim 2, comprising:
    said longitudinal seam includes two joined edges;
    a first of said edges including edge tabs;
    a second of said edges including slots for accepting said edge tabs; and
    the joined edges are locked flush together in a gap-free locking arrangement of edge tabs extending into corresponding slots.

5. The one-piece electrical fitting of claim 1, comprising:
    a rolled edge on said trailing end of said connector body; and
    said edge is rolled outwardly of said tubular connector body.

6. The one-piece electrical fitting of claim 5, comprising a gap on the trailing end of the connector body, said gap including an unrolled portion of said trailing end of said connector body.

7. The one-piece electrical fitting of claim 1, wherein the cap includes a narrow aspect and a wide aspect.

8. The one-piece electrical fitting of claim 1 comprising a flange on said grounding tang, said flange to contact and establish electrical continuity with the wall of an electrical box.

9. The one-piece electrical fitting of claim 1 comprising said one or more auxiliary grounding tangs on said tubular connector body to contact and establish electrical continuity with the electrical box wall surrounding the knockout aperture.

* * * * *